(12) United States Patent
Bares et al.

(10) Patent No.: US 12,030,172 B2
(45) Date of Patent: Jul. 9, 2024

(54) PERSONAL CASE SYSTEM WITH INTERCHANGEABLE TOUCHLESS TOOL FEATURE AND METHOD OF ITS USE

(71) Applicants: Christopher Edward Bares, Lexington, MA (US); Lauren Elizabeth Davis, Roseville, CA (US)

(72) Inventors: Christopher Edward Bares, Lexington, MA (US); Lauren Elizabeth Davis, Roseville, CA (US)

( * ) Notice: Subject to any disclaimer, the term of this patent is extended or adjusted under 35 U.S.C. 154(b) by 571 days.

(21) Appl. No.: 17/354,515

(22) Filed: Jun. 22, 2021

(65) Prior Publication Data

US 2021/0394355 A1   Dec. 23, 2021

Related U.S. Application Data

(60) Provisional application No. 63/205,689, filed on Jan. 4, 2021, provisional application No. 63/043,119, filed on Jun. 23, 2020.

(51) Int. Cl.
*B25J 1/04* (2006.01)
*B25F 1/04* (2006.01)

(52) U.S. Cl.
CPC .. *B25J 1/04* (2013.01); *B25F 1/04* (2013.01)

(58) Field of Classification Search
CPC ...................................... B25J 1/04; B25F 1/04
See application file for complete search history.

(56) References Cited

U.S. PATENT DOCUMENTS

| | | | |
|---|---|---|---|
| 3,606,777 A | 8/1970 | Watson | |
| 4,524,594 A | 6/1985 | Bascou | |
| 8,225,633 B2 | 7/2012 | Luo et al. | |
| 8,726,952 B2 | 5/2014 | Jambunathan et al. | |
| 9,765,535 B2 | 9/2017 | Montgomery | |
| 10,278,466 B2 * | 5/2019 | Talarico | A45C 11/182 |
| 10,630,333 B1 * | 4/2020 | Mossoba | H04B 1/3888 |
| 10,653,222 B2 * | 5/2020 | Scharnigg | B65D 83/08 |
| 2005/0022635 A1 | 2/2005 | Ackeret et al. | |
| 2007/0289101 A1 | 12/2007 | Casteel et al. | |

(Continued)

FOREIGN PATENT DOCUMENTS

CN   104416542 A   3/2015

OTHER PUBLICATIONS

PCT/US2021/038594, Written Opinion of the International Searching Authority, Sep. 23, 2021.

*Primary Examiner* — Stephen A Vu
(74) *Attorney, Agent, or Firm* — Law Office of Ilya Libenzon

(57) ABSTRACT

A personal case system with interchangeable touchless tool feature and a method of its use are provided. The system includes a tool having a spine, a distal end and a proximate end. The tool is pivotally connected by the proximate end to a casing at a pivot point. The casing includes a front side, a back side, a sidewall formed by a top side, bottom side and a rear side, and a space formed between the front side and the back side and adapted to receive at least a portion of the tool; wherein the tool can be rotated, relative to the casing, around the pivot point between an open position in which the tool extends from the casing, and a closed position in which the tool retracts into the space of the casing; and wherein the pivot point is located at the top corner of the casing opposite the rear side.

20 Claims, 18 Drawing Sheets

(56) References Cited

U.S. PATENT DOCUMENTS

| | | |
|---|---|---|
| 2009/0113964 A1 | 5/2009 | Calor et al. |
| 2009/0308782 A1 | 12/2009 | Grist |
| 2011/0304971 A1 | 12/2011 | Kelley et al. |
| 2012/0067473 A1* | 3/2012 | Khounsombath ........ A45C 1/06 |
| | | 150/147 |
| 2013/0220879 A1* | 8/2013 | Glass .................... B65D 85/00 |
| | | 206/767 |
| 2015/0059937 A1 | 3/2015 | Singer |
| 2017/0245609 A1 | 8/2017 | Alexander |
| 2018/0140061 A1 | 5/2018 | Chan et al. |
| 2019/0015997 A1 | 1/2019 | Johnson et al. |
| 2019/0298024 A1 | 10/2019 | Gandhi et al. |
| 2020/0086477 A1 | 3/2020 | Fulkerson |

* cited by examiner

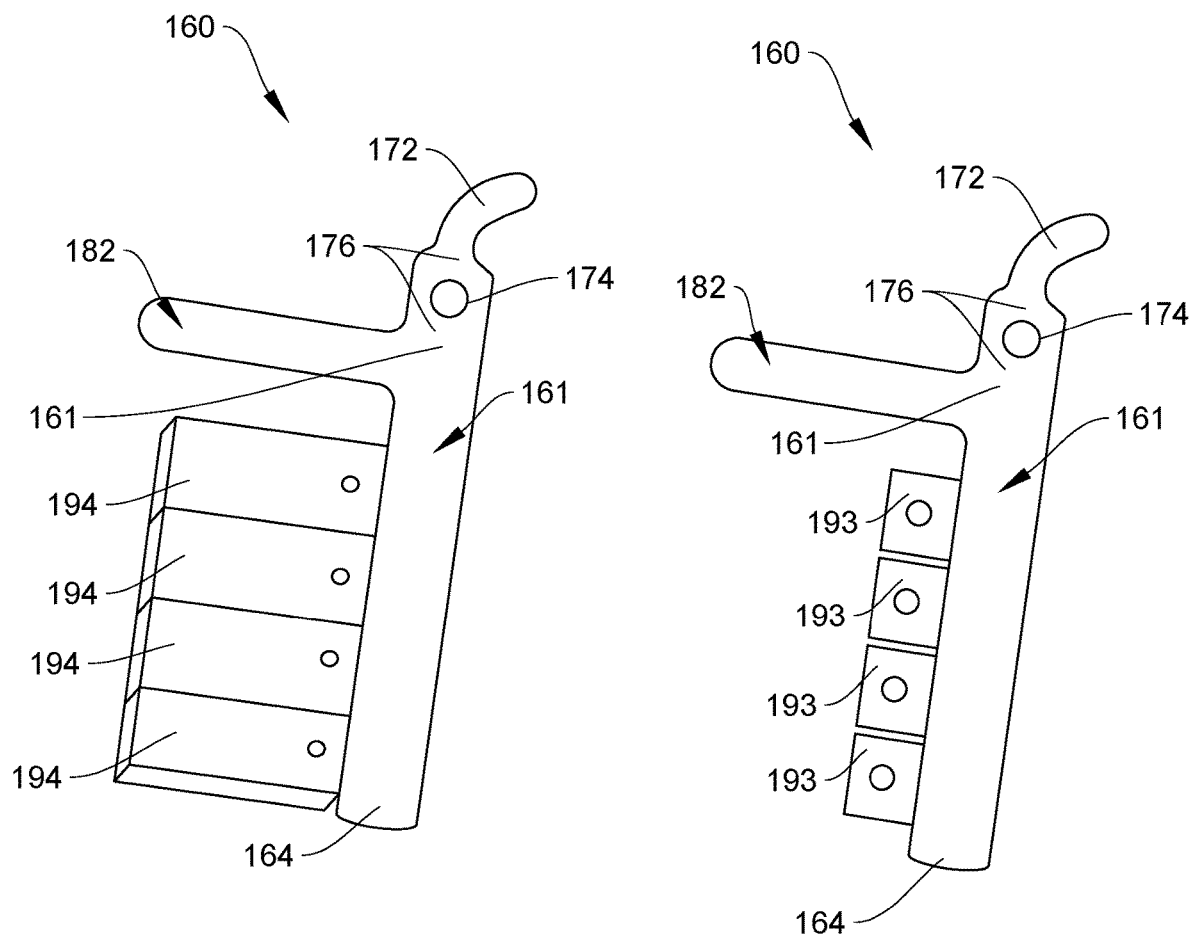
FIG. 14   FIG. 15
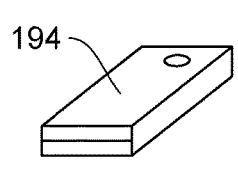   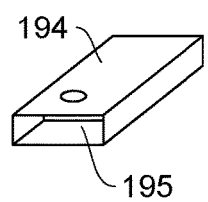
FIG. 16A   FIG. 16B

PERSONAL CASE SYSTEM WITH INTERCHANGEABLE TOUCHLESS TOOL FEATURE AND METHOD OF ITS USE

CROSS-REFERENCE TO RELATED APPLICATIONS

This application claims the benefit of U.S. provisional patent application No. 63/043,119 filed on Jun. 23, 2020 and U.S. provisional patent application No. 63/205,689 filed on Dec. 21, 2020, the contents of which are incorporated by reference in their entirety.

TECHNICAL FIELD

The present invention relates to novel touchless safety systems and apparatuses for storing, accessing, and utilizing these systems to interact with surfaces that may be contaminated with viruses. More particularly, the invention relates to a touchless safety system that is configured for storage on, access from, and use with the case of a mobile phone and the like.

BACKGROUND ART

Illness prevention has been a fast growing area of interest as concern about the spread of dangerous viruses increases. The presence of contaminants is often unknown and encounters with contaminated surfaces are difficult to anticipate. Illness prevention may include use of portable objects in lieu of direct skin contact in the moments their users interact with unclean surfaces. These objects are traditionally disposable devices such as wipes, napkins, sanitizers, gloves, and the like, and require degrees of preparation and cleanup before and after each usage.

More recently, hook-shaped plastic or metal objects often referred to as touchless keys have been adapted to substitute for disposable devices. These keys offer the advantage of reusability. However, proper use of these keys also requires a practiced discipline and a consideration of methods of storage and retrieval. These keys must be stored in a manner that prevents cross contamination of other surfaces and in a location that is easily accessible when the key is needed for subsequent uses.

Certain casing and key combination tools [combo-tools] have been developed to cover the key after its use. These combo-tools are configured to prevent the key from cross contaminating other surfaces when the tool is not being used.

However, these combo-tools suffer many drawbacks that hinder their availability and usability when the tool is needed for illness prevention. These combo-tools have limited storage configurations, which results in fewer opportunities to use the tool. Storage configurations allow these tools to pair with other objects, and therefore, promote the availability of the tool. However, configurations are enhancing only if they pair the tool with objects that are within reasonable reach of the user at the moment tool is needed. The most popular storage configurations are limited to holes and loops for key-chains, bag-straps, and the like. To the many would-be users who do not own or who do not habitually carry bags or key-chains, such configurations do not promote the availability of these tools.

Yet another shortcoming of many popular storage configurations of these combo-tools is that they promote temporary affixations of the tools to their paired objects and the removal from the objects before use. This results in a heavier burden of discipline on users to restore the pairing of tools with their objects and thereby increases the risk of misplacement.

Another drawback of these combo-tools is that they are configured with burdensome methods for extracting their keys from their casings. There extraction configurations require either the use of both hands or skilled fingers to unholster the key from its casing, or an unnatural and awkward movement of the thumb to expel the key along a track. Such extraction methods complicate and hinder the users access to the tool.

Another drawback of these combo-tools is the limited functions of their casings. Their casings are configured to serve no other purpose than as a cover for the key to prevent cross contamination and offer users with no other reasons to carry the tool. Thus, users are motivated to carry the casing only if they continue to anticipate the need for an illness prevention tool. This increases the burden on the user to develop the habit for carrying the casing, and results in a risk that the user will forget to carry the tool. All of these disadvantages work together to negatively impact the usability and availability of touchless keys for illness prevention.

A need exists in the field for a novel touchless safety system that is configured for storage on the case of a mobile phone and the like, which will enhance the availability of the system to users who carry a mobile phone. Yet a further need exists for the system to be configured for use while it is simultaneously paired with the casing of a mobile phone, which is important for maintaining the availability of the system enhanced by its storage configuration. There is also a need for the system to be configured with a method for extracting its key that promotes access to and use of the system while paired with mobile phone. Finally, there is also a need for the system to be configured with multiple features to thereby further promote the availability of the system for illness prevention use.

SUMMARY OF THE EMBODIMENTS

A personal case system with interchangeable touchless tool feature and a method of its use are provided. The system includes a tool having a spine, a distal end and a proximate end. The tool is pivotally connected by the proximate end to a casing at a pivot point. The casing includes a front side, a back side, a sidewall formed by a top side, bottom side and a rear side, and a space formed between the front side and the back side and adapted to receive at least a portion of the tool; wherein the tool can be rotated, relative to the casing, around the pivot point between an open position in which the tool extends from the casing, and a closed position in which the tool retracts into the space of the casing; and wherein the pivot point is located at the top corner of the casing opposite the rear side.

In some instances, the tool can include a trigger member extending substantially perpendicularly from the spine of the tool at the proximate end, and the pivot point is positioned on the spine above the trigger member. It can also include a first grab member extending substantially perpendicularly from the spine of the tool at the distal end. In some instances, the tool can include a second grab member extending substantially perpendicularly from a middle of the spine of the tool. According to some embodiments of the present disclosure, the distal end of the tool can terminate in a touch extension member. In some instances, the proximate end of the tool can terminate in a top tab. The casing can include a stopper configured to prevent the tool from extending by more than 90 degrees. The casing can include a storage compartment therein and a removable lid disposed in the rear side of the sidewall. The tool can include one or more USB holders, or one more nail filers, or a laser pointer, or a combination thereof.

Other aspects, embodiments and features of the device and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood, however, that neither the device nor the method is limited to the precise arrangements and instrumentalities shown.

FIG. 14 is a side elevation view of a USB drive storage tool illustrating another example of a tool according to various embodiments of the present disclosure.

FIG. 15 shows the example of FIG. 14 with the USB drive features removed.

FIGS. 16A and 16B show front and back perspective views of the USB drive feature of FIG. 14.

DETAILED DESCRIPTION OF SPECIFIC EMBODIMENTS

Figure 1A:
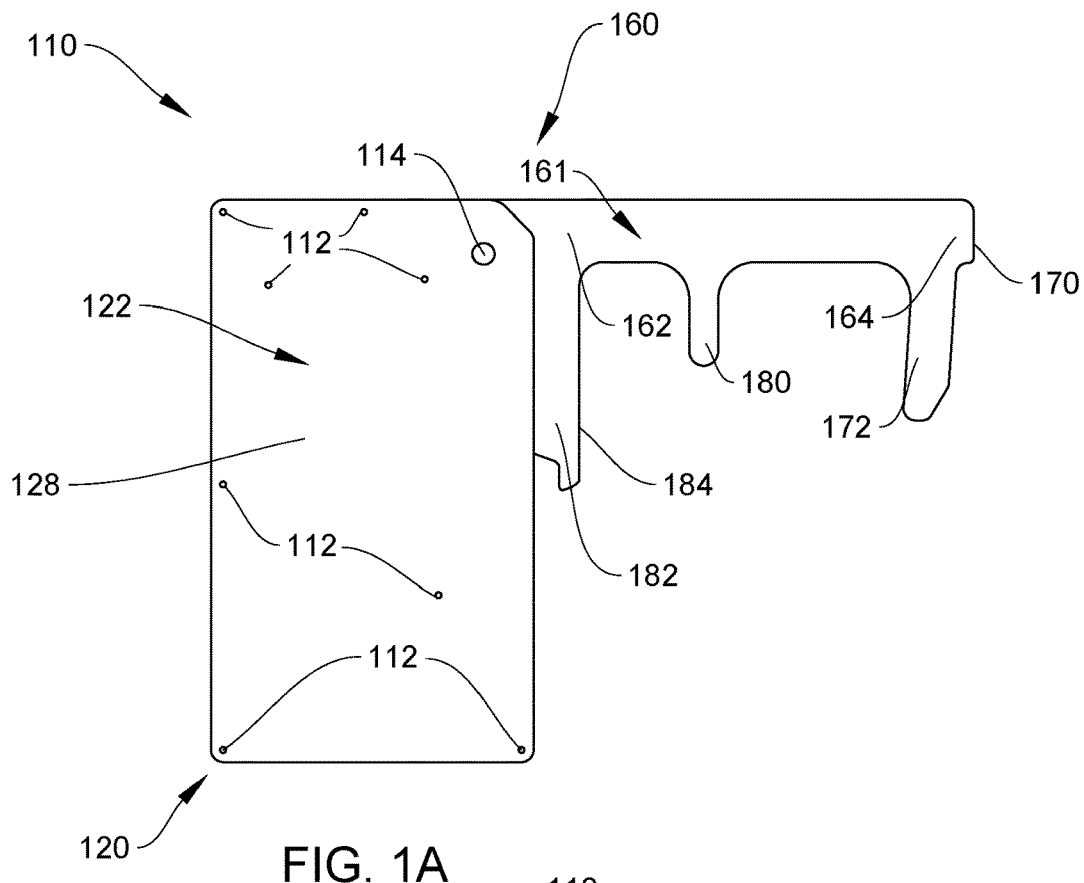
FIGS. 1A, 1B, and 1C are side elevation views of an example of a personal case system with touchless-tool feature, showing in various rotational positions, according to various embodiments of the present disclosure.

The terminology used herein is for the purpose of describing particular embodiments only and is not intended to be limiting of the disclosure. As used herein, the singular forms "a," "an," and "the" are intended to include the plural forms as well as the singular forms, unless the context clearly indicates otherwise. It will be further understood that the terms "comprises" and/or "comprising," when used in this specification specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

For the purpose of the present disclosure, the use of terms such as above, below, right, left, etc., may be used to describe features of the embodiments, and are to be understood as referring to the features as they appear in the figures, without limiting those features as they may be employed in actual embodiments. Where used, the terms inward, and outward will be with reference to a center of the described device.

Bias, as used in the specification and claims, is an energy potential. Such as a push, a pull, a difference in pressure, etc., that can impart energy to or through an element subject to the bias, in the form, for example, of kinetic energy.

The description and drawings herein are merely illustrative and various modifications and changes can be made in the structures disclosed without departing from the scope of the appended claims.

Many commonly known features of folding systems are omitted in the figures and descriptions of embodiments of the disclosure. For example, fasteners, such as machine screws, bolts, rivets, pins, etc., are well known in the art, may be used in the manufacturing process, and need not be discussed in detail here. Where they are shown at all in the figures, fasteners that may be used are indicated generically by reference number 112 and are not detailed in the description. It is understood that one of ordinary skill will be able to provide appropriate fasteners in accordance with any specific configuration or design. Likewise, the point around which the system rotates is referred to herein as the pivot point 114, and may comprise multiple components. Components around which the system pivots may be described as or shown in figures merely as an aperture referred to as pivot point 114. Where specific elements are not discussed, one of ordinary skill will recognize that a pin, rivet, machine screw, or similar element or group of elements is employed in these apertures. Other features may be described to provide context for the embodiments disclosed, but are not essential. Accordingly, no feature or element is to be construed as being essential to a claimed embodiment unless specifically indicated as such.

Figure 1B:
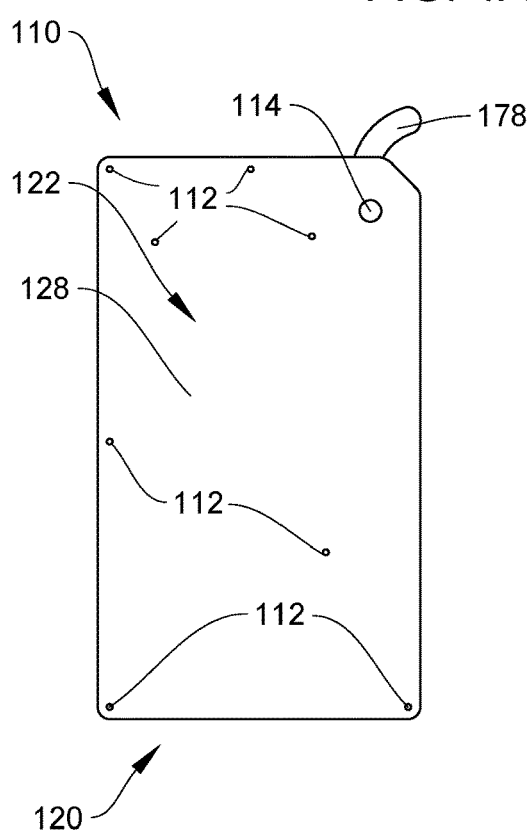
Figure 1C:
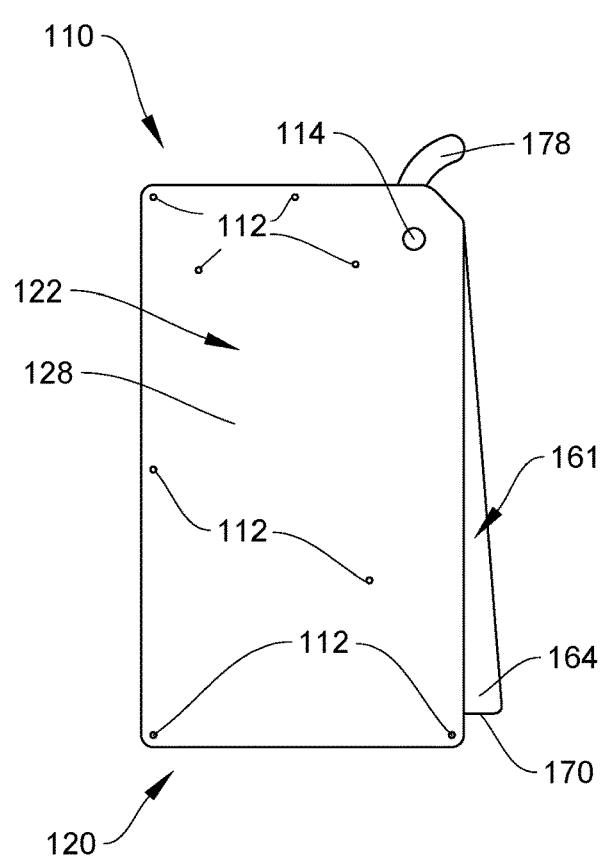
Figure 2:
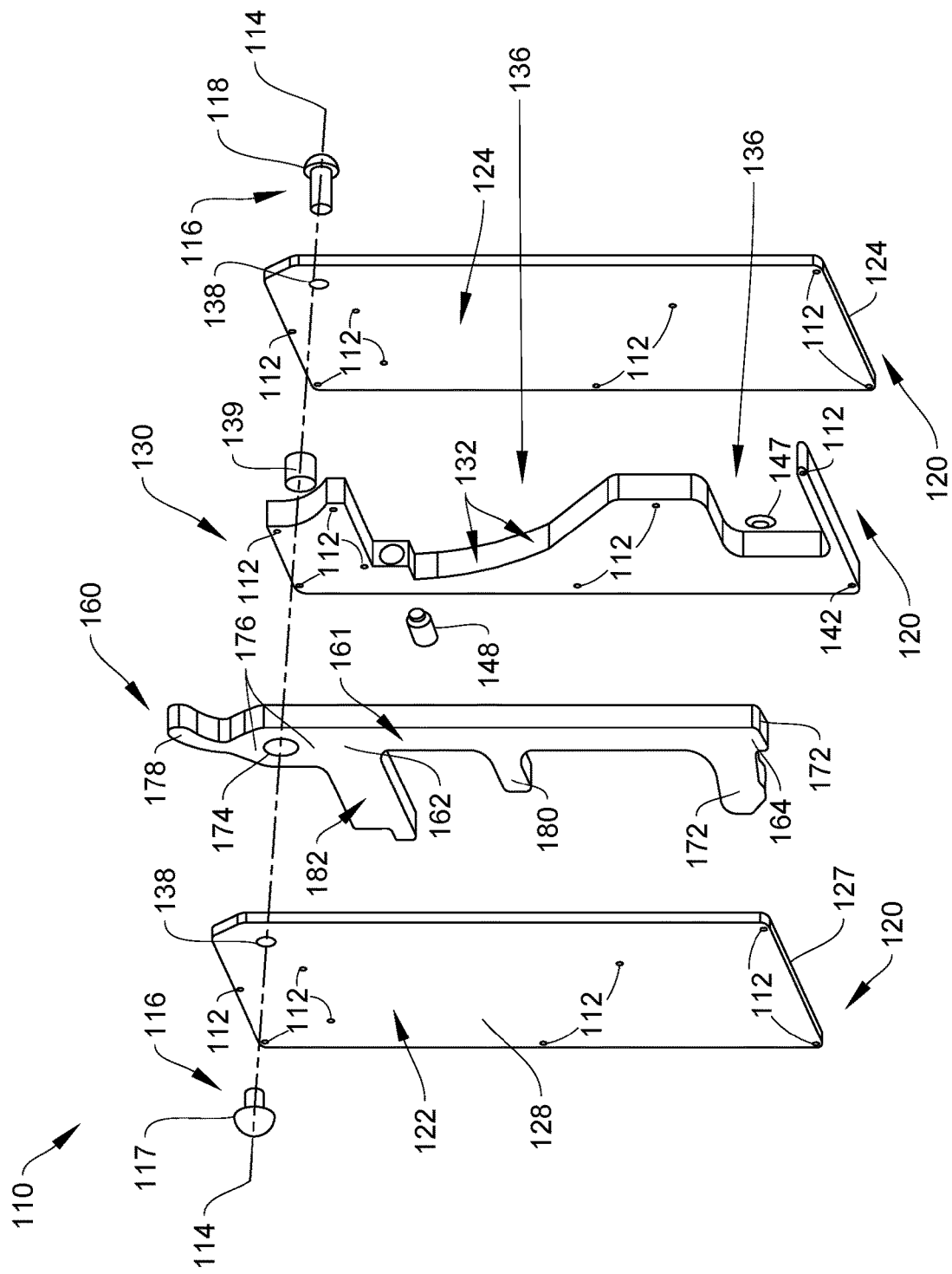
FIG. 2 is an exploded perspective view of the example of FIG. 1B.
Figure 3:
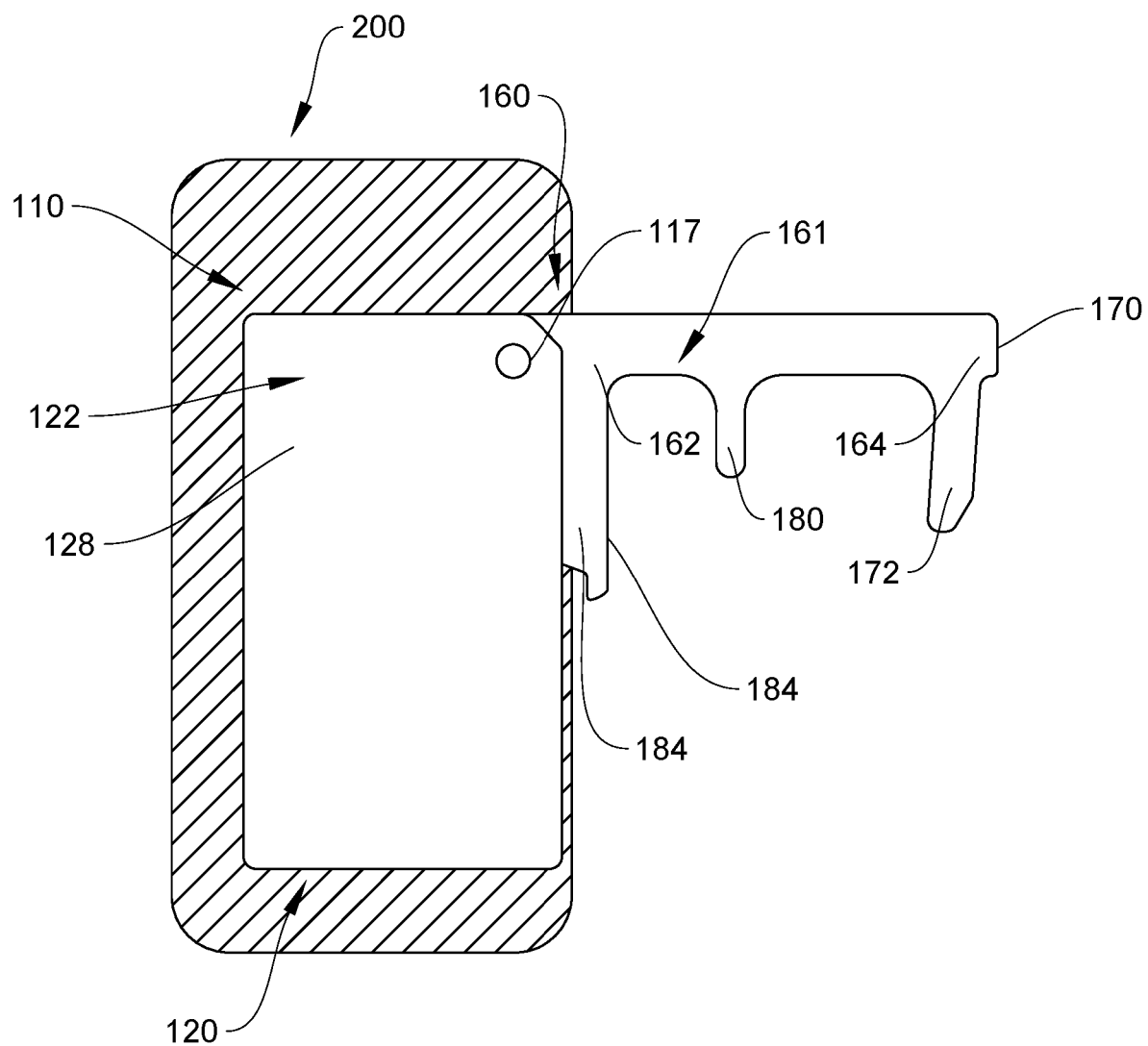
FIG. 3 is a side elevation view of the example of FIG. 1A positioned on a mobile phone case.

FIG. 1 and FIG. 2 illustrate an example of a personal case system with touchless-tool feature 110, according to various embodiments of the present disclosure. The system 110 in FIG. 1 and FIG. 2 includes a body, or casing 120, and a touchless-tool feature integrated into a tool 160, which will be referred to hereafter as the tool 160 unless otherwise noted. The casing 120 and the tool 160 are pivotally coupled together at a pivot point 114 such that the tool 160 can be rotated, relative to the casing 120, around the pivot point 114 between an open position, in which the tool 160 extends from the casing 120 (FIG. 1A), and a closed position (FIG. 1B) in which the tool retracts into space, or a holster 136 provided in the casing 120. The casing 120 includes an exterior surface 122 comprising a front area 126 and a back area 128. The casing also includes an opposing interior surface 124 surrounding an interior structure 130, described herein. The tool 160 includes a fixture area 176 that may connect to a trigger 182, and/or a top tab 178. The casing 120 and the tool 160 comprise the features of system 110 and are configured in combination to fix and use system 110 in conjunction with a mobile phone case 200, and the like. The tool 160 can be coated with at least one of an antibacterial coating and antimicrobial coating. The casing 120 can also be coated with an antibacterial and/or antimicrobial coating. Back and front slabs 127, 125 are fixed to the interior structure 130 of the casing 120, and are configured to fasten the system 110 to a mobile phone case 200, as shown in FIG. 3. The back and front areas 128, 126 of the exterior surface 122 are formed on the outside of the back and front slabs 127, 125 and may connect indirectly to the mobile phone case 200. Which respective area of exterior surface 122 connects to the mobile phone case 200 depends on user preference and is typically determined by the users dominant hand. Right handed users will typically fasten the front area 128 of the casing 120 to the mobile phone case 200, with the tool 160, in an open position, extending to the right, as shown in FIG. 3. Left handed users typically will flip the system 110 over 180 degrees to fasten the back area 128 of the casing 120 to the mobile phone case 200, which would result in a mirror image of that shown in FIG. 3.

The exterior surface 122 of the casing 120 can be fastened to the mobile phone case 200 using double sided acrylic tape or the like. Preferably, front and back slabs 127, 125 may comprise an exterior surface 122 that is glossy and/or are capable of adhering to adhesive tapes of varying qualities, and that is flat and/or is able to fully connect with the surface of a mobile phone case 200 or the like. In alternative embodiments, either the back or front slabs 127, 125 may be fixed to a mobile phone case 200 with pins, adhesive glue, and/or by other means. In further alternative embodiments, either the back or front slabs 125, 127 may be fused to a mobile phone case 200 using one of the manufacturing processes discussed herein. In some instances, when a mobile phone does not have a protective case, the casing (via exterior surface 122) can be removably or permanently attached to a mobile phone itself using various attaching means such as double sided adhesive, Velcro, glue or the like.

The fixture area 176 of the tool 160 comprises the material surrounding the tool attachment feature 174 and can be configured in combination with the holster 136 of the casing 120 to allow a user to fully open and operate features of the tool 160 at or beyond a 90 degree rotational plane centered at the pivot point 114. The holster 136 includes a holster attachment feature 138, with which the tool attachment feature 174 aligns as the tool 160 rotates in between the back and front slabs of the casing 120. The boundary of the 90 degree rotational plane is defined by the closed position, at 0 degrees, and the open position, at 90 degrees. That is, when the tool 160 is in the closed position, as shown in FIG. 1B, the top tab 178 feature fully extends from the top of the casing 120, and when the tool 160 is in the open position, as shown in FIG. 1A, the operational edge 184 of the trigger 182 and the tool 160 fully extend from the holster 136 of the casing 120.

In the present and preferred embodiments, the holster attachment feature 138 is positioned substantially off center of the casing to allow the fixture area 176 of the tool 160 to rotate to the edges of the casing 120, and, in turn, allow features of the tool 160 to extend from between the two slabs 127, 125, as shown in FIG. 1.

Referring to the image of the tool 160 shown in FIG. 2, material comprising the fixture area 176 above and below the attachment feature 174 connects the top tab 178, the trigger 182, and touchless-tool features to the tool 160. The fixture area 176 above the attachment feature 174 connects to the top tab 178 feature. The fixture area 176 below the attachment feature 174, which includes a larger body of material extending from the attachment feature 174, connects to both the trigger 182 and the first end 162 of the primary spine 161 of the tool 160.

The holster attachment feature 138 on the casing 120 is positioned relative to the configuration of the fixture area 176 to allow the surrounding fixture area 176 to extend approximately to the boundaries of the slabs 127, 125. Thus, features connected to the fixture area 176 can, in turn, sufficiently extend beyond the boundaries of the two slabs 127, 125, as illustrated by features in the open (FIG. 1A) and closed positions (FIG. 1B).

In the various embodiments of the system 110, the fixture area 176 and the holster 136 may be reconfigured to increase or reduce the ability of the tool 160 to extend from beyond the edges of the two slabs 127, 125. In one embodiment of the system 110, the holster and the tool attachment features 138, 174 may be repositioned further from the center of the casing 120 to allow features to extend further from the slabs 127, 125. In another embodiment of system 110, the material comprising the fixture area 176 of the tool 160 below the attachment feature 174, shown in FIG. 2, may be reduced in size to provide room to increase the length of the primary spine 161. Reconfigurations of the holster 136 of the casing 120 and fixture area 176 of the tool 160 may impact surrounding areas of the system 110, so may require further changes to materials and structures, discussed herein.

The touchless-tool feature is defined by examples of the tool 160 shown in FIG. 1-4, 7, 12, 13 generally including a primary spine 161 that extends from the fixture area 176 at the first end 162 of the primary spine 161 to an touch extension feature 170 at the second end 164 of the primary spine 161, and configured in combination with the casing 120 to provide a user with means to engage with surfaces without having to directly interact with the surfaces.

The touch extension feature 170 extends from the second end 164 of the primary spine 161 much like the shape of a finger of a human hand, in a way that enables the user to engage with surfaces like a user would engage a surface with the touch of a fingertip. A primary grab feature 172 may extend from the primary spine 161 from an area before the touch extension feature 170 to allow the touch extension feature 170 to form a lip at the top outward edge of the primary grab feature 172. The primary spine 161 and the primary grab feature 172 extend from the holster of the casing 120 much like the shape a finger of a human hand makes to secure an object. In some instances, the tool 160 can include a clip disposed on the primary spine 161 and adapted to be used as a card holder (for credit cards, gift cards, cash and the like).

In this and preferred embodiments, a second grab feature 180 comprises a bar fixed solely to the primary spine 161 between the trigger 182 and the primary grab feature 172 and is configured to assist in the use of the primary grab feature 172 by guarding a users fingers from contacting surfaces engaged by the primary grab feature 172. A users finger is positioned facing the inside edge, maybe in front of a trigger 182. Objects hooked by the inside edge of the primary grab feature 172 can be blocked from potentially contacting a users fingers by the outside edge of the second grab feature 180. The trigger 182 of the tool 160 is formed in the manner of a third grab feature, and is configured to allow the user to control the weight placed on the tool 160 by outside objects.

Preferably, the tool 160 is formed from of a strong conductive material, such as aluminum, that supports weight placed on the grab features 172, 180 and that is conductive and capable of interacting with touch screen kiosks and the like. Alternative embodiments of the tool 160 may be formed of a hard polymer, preferably with corners that form thicker curves to strengthen the connection between features of the tool 160.

A trigger 182 extends from the fixture area 176 of the tool 160 and is configured to support the operation of the tool 160. In this, and in preferred embodiments, the operational edge 184 of the trigger 182 extends beyond the edge of holster 136 when the tool 160 rotates to an open position, and allows the user to access and apply pressure to the tool 160 separately from the casing 120. To support this arrangement, a vertical axis defined by the operational edge 184 of the trigger 182 when the tool 160 is in an open position, as shown in FIG. 1B, aligns substantially ahead of a vertical axis that intercepts the pivot point 114.

The user can configure the system 110 in combination with a mobile phone case 200 to be able to with one hand control the tool 160 while maintaining a grip on the phone case 200. This configuration is perhaps best illustrated in FIG. 3, where the system 110 is fastened to the back of a phone case 200. The tool 160 is in an open position and the operational edge 184 of the trigger 182 extends beyond the edge of the holster 136 of the casing 120. In turn, the edge of the holster 136 is positioned adjacent the edge of the mobile phone case 200, thus allowing the operational edge to extend beyond the edge of the phone case 200. The user can control the operational edge of the tool 160 extending from one side of the phone case 200 while maintaining a grasp on the opposite side of the phone case 200.

Referring to FIG. 1A, the distance that the operational edge 184 extends, or protrudes, beyond the edge of the holster 136 when the tool is in an open position, can be defined as the difference in distance between a vertical axis intercepting the pivot point 114 and two distinct vertical axis; the first distinct vertical axis defined by the edge of the holster 136; the second distinct vertical axis defined by the operational edge 184 of the trigger 182. Thus, alternative embodiments may protrude the operational edge 184 by increasing the thickness of the trigger and/or by repositioning the operational edge 184 further toward the second end of the primary spine 161, consequently reducing the length of the spine between the trigger 182 and grab features 172, 180. Other alternative embodiments, may protrude the operational edge 184 by relocating the pivot point 114 closer to the edge of the holster 136, consequently reducing support for the connection between the tool 160 and the casing 120 by reducing material between the holster attachment feature 138 and the edges of the casing 120.

Referring to FIG. 2, a top tab 178 connects to the fixture area 176 of the tool 160 and is configured to guide the movement of the tool 160. The tool 160 in a closed position, the top tab 178 extends from the top of the casing 120. Movement of the top tab 178 in any allowable direction causes the features connected to the opposing side of the fixture area 176, the touchless-tool features as shown in FIG. 2, to move in the opposite direction. The user can apply bias to the top tab 178 to rotate the top tab 178 into the top of the casing 120, as perhaps best shown in FIG. 1B, and thereby cause the tool to move into an open position.

To increase the ability of the user to influence the movement of the tool 160 with the top tab 178, the top tab 178 can be configured, in combination with the interior structure 130 of the casing, to increase the allowable range of motion of the tool 160. In preferred embodiments, the top tab 178 may be configured with a curved angle that, when inserted between the slabs 127, 125 of the casing, affects the greatest possible angle of rotation of the tool 160. As shown in the embodiment in FIG. 1B, the user can fully insert the top tab 178 into the casing to cause the tool 160 to rotate into the open position at the maximum 90 degree angle, which is set by the interior structure 130 discussed herein.

The tool 160 comprising its features, preferably, is configured to a length and thickness that supports the movement of the tool into the casing 120. The length, as measured by the distance from pivot point 114 to the most outward rotational point of the tool 160, preferably is short enough to fit into the holster 136 of the casing when the tool 160 is in a closed position. The thickness, preferably, is less than the height of the interior structure 130 of the casing, as described herein, to allow the holster to receive the tool 160 in the closed position.

In preferred embodiments, the casing 120 and tool 160 are detachably joined at the pivot point 114 with a connecting apparatus 116 comprising separable male and female ends. FIG. 2 shows the connecting apparatus 116 in the form of a Chicago bolt with a male end, comprising a screw 117, and a female end, comprising a post 118. The tool 160 and the casing 120 are configured to operate with the connecting apparatuses 117, 118 to define the pivot point 114. As shown in FIG. 2, a tool attachment feature 174 and a holster attachment feature 138, comprising aligning apertures in the back and front slabs 127, 125 of the casing 120, further comprise circular holes, and are configured to receive the connecting apparatus post 118. The attachment features align along a common access, or pivot point 114, with the screw 117 and post 118 of the connecting apparatus 116 positioned at opposing ends. The heads of the screw 117 and post 118 can be round as shown in FIG. 2, for example, or can be flat to allow for a better fitting of the casing to a smart phone or a smart phone protective case. It should be appreciated by those skilled in the art, that attachment features and the method for utilizing the features to join the components of a personal case system may include means of any form and technique without departing from the present disclosure. Other attachment means may include, but are not limited to, snap features, frictional fit, hinge connections, a combination thereof, or a unitary construction.

FIG. 4 shows the system 110 with the back slab 127 removed to reveal the underlying interior structure 130 of the partially constructed system 110 with the tool 160 in several rotational positions. As shown in FIG. 4, the system 110 includes the tool 160, the interior structure 130, and the front slab 125. The slabs 127, 125 of the casing 120 are substantially symmetrical, each having features that are mirrored by the similar features of the other. Thus, an understanding of the overall structure of the system 110 can be obtained through a description of the partial views shown in the figures.

An interior structure 130 is fixed between the slabs 127, 125 and is configured to define the movement of the tool between the open and the closed position. The interior structure 130 may comprise a plurality of features configured to permit the tool to travel between the slabs 127, 125 with minimal drag or friction, to limit the travel of the tool between an open and a closed position, to provide the holster 136 space to receive the tool 160 while the tool 160 is in the closed position, and to shape the holster 136 and other features of the casing. Various arrangements of the interior structure 130, and combinations of features are discussed herein.

Figure 4A:
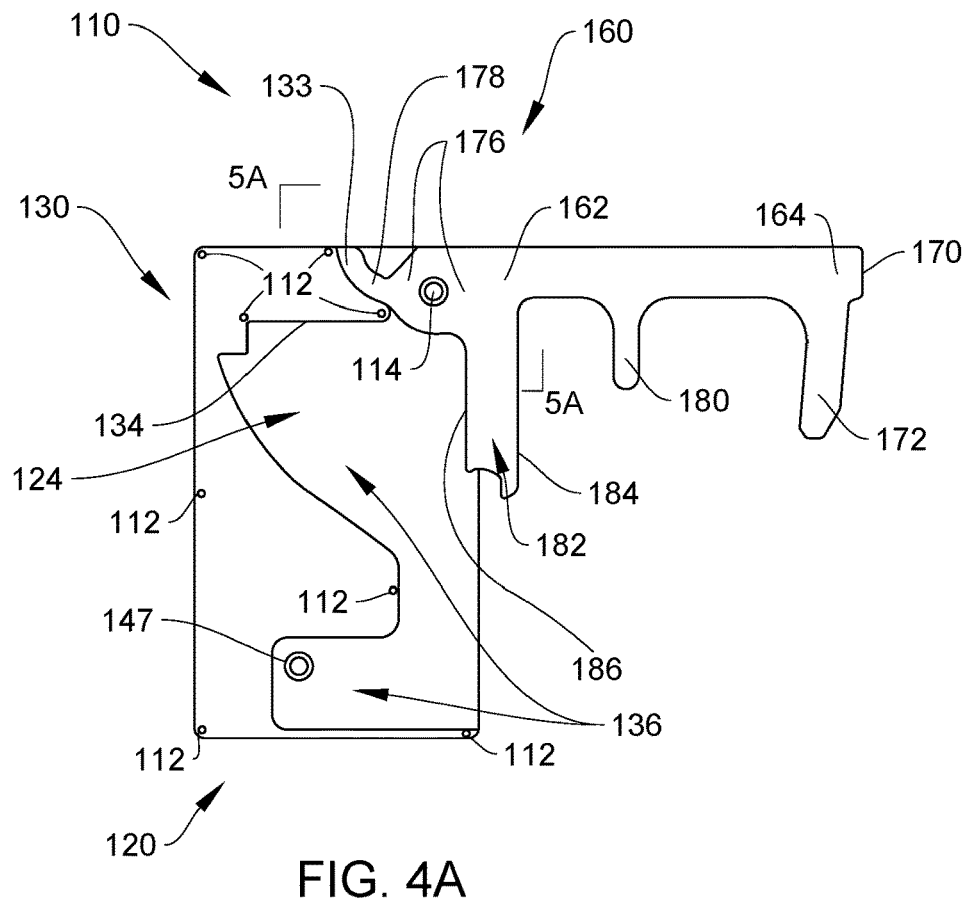
FIGS. 4A, 4B, and 4C show the example of FIGS. 1A, 1B, 1C, with the back slab removed.
Figures 4B, 4C:
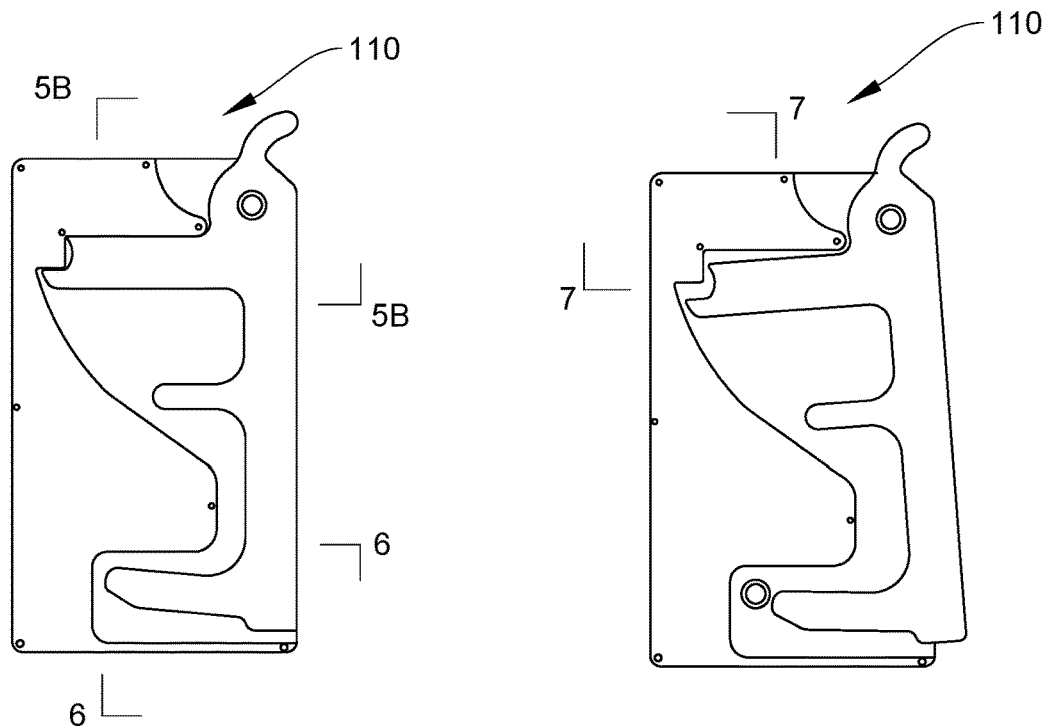
Figure 5A:
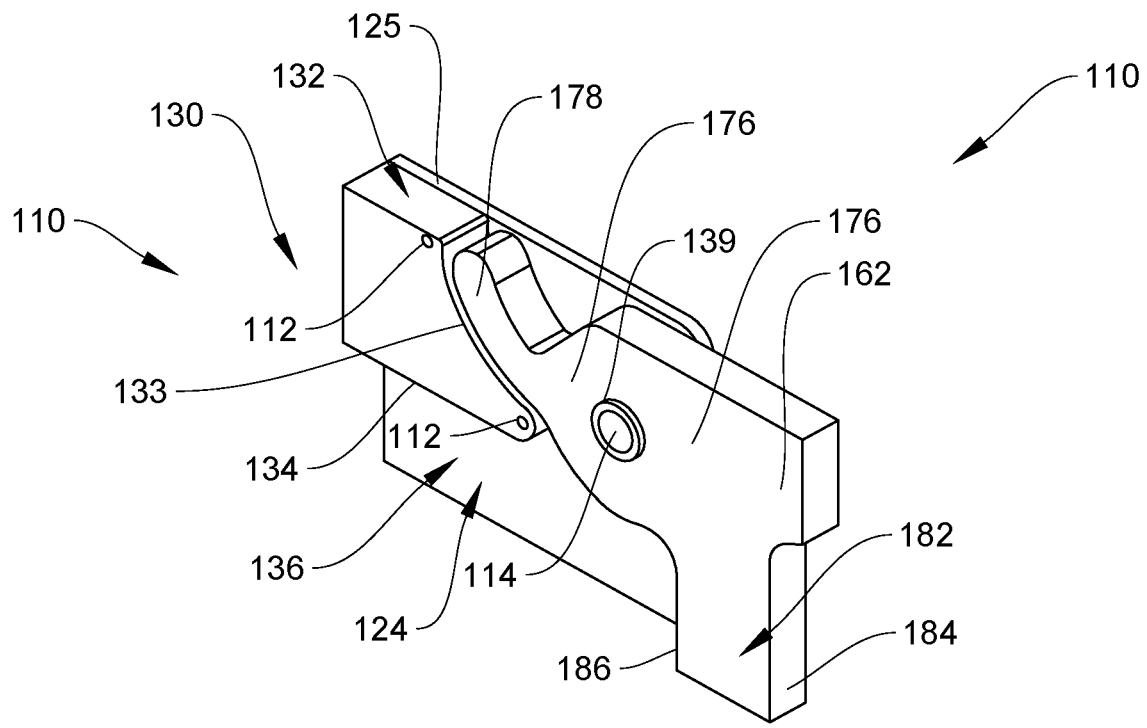
FIGS. 5A and 5B are enlarged perspective views of a section of the example of FIGS. 4A and 4B taken in windows as indicated in FIGS. 4A and 4B by corners 5A-5A and 5B-5B.
Figure 5B:
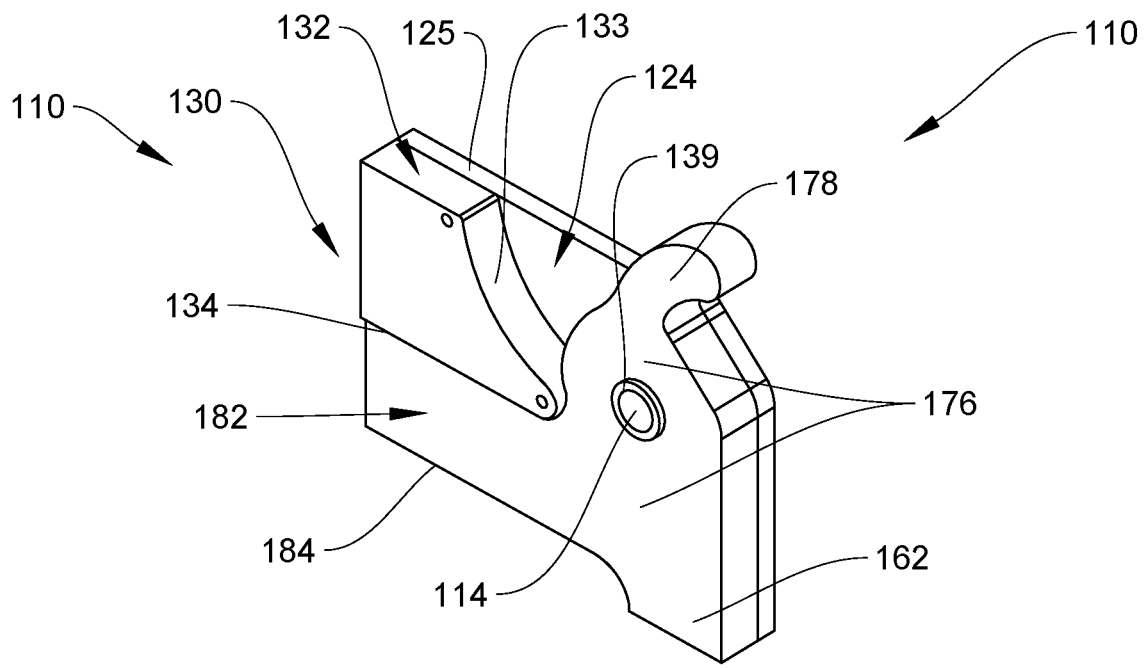

Referring to FIGS. 5A and 5B, enlarged perspective views of a section of the system 110 are taken in windows indicated in FIGS. 4A and 4B by corners 5A-5A and 5B-5B. FIGS. 5A and 5B show various aspects of the system 110 as described below with references to FIGS. 1-4.

To ensure the surfaces of the tool 160 surrounding the tool attachment feature 174 are disengaged from the interior surface 124 of the casing 120 and can freely rotate around the pivot point 114, features of interior structure 130 adjacent the pivot point may be configured in combination with the holster attachment feature 138 to ensure the surrounding areas of the of the back and front slabs 127, 125 remain sufficiently separated from each other. Features of interior structure 130 adjacent the pivot point 114 may be further configured in combination with the features of interior structure 130 second adjacent to the pivot point 114 that serve to limit the travel of the tool 160 between the open and the closed position.

A washer 139 extends between the slabs 127, 125 of the casing 120 surrounding the holster attachment feature 138 and is configured to facilitate the rotational movement of the tool 160 by limiting potential friction between the interior surface 124 of the casing 120 and the surface of the tool 160 adjacent the fixture area 176. The washer 139 includes an outside diameter smaller than the tool attachment feature 174 and larger than the holster attachment feature 138. Thus, the washer 139 can be arranged to be fed through the tool attachment feature 174 while sitting between the slabs 127, 125. In this arrangement the connection apparatus post 118 can be fed through the holster attachment feature 138 and the center of the washer 139. Thus, the washer allows the post (bolt) to be tightly fastened without restricting the pivotal movement of the tool. The washer prevents the slabs of the case from sandwiching the tool and restricting its movement. Tight application also prevents the post (bolt) from loosening.

Preferably, the height of the washer 139 is configured to match the height of the wall 132 and connect to the slabs 127, 125 on the same planes. Thus, the washer 139 protects the rotational movement of the tool 160 from friction caused by outside forces that may compress the slabs 127, 125 against the surface of the tool 160.

According to another embodiment of the present disclosure, a bolt coated with VibraTite coating can be employed. The VibraTite coating prevents a fastened bolt from loosening when coated on the screw. VibraTite-coated bolt can be used in lieu of Washer 139, because when applied to the screw, there is no need to tightly fasten the bolt to prevent it from loosening.

Also visible in FIGS. 5A and 5B, the interior structure 130 at the top of the casing includes a front-stopper 133 and a back-stopper 134 that are positioned second adjacent to the pivot point 114 relative to the washer 139 and that are configured to limit the travel of the tool 160 between the open and closed position. The top tab 178 and the back edge 186 of the trigger 182 of the tool 160 travel between the front and a back stopper 133, 134 of the interior structure 130 to define the rotational movement of the tool 160. Thus, when the tool is in an open position, as shown in FIG. 5A, the top tab 178 is in full contact with the front-stopper 133. When the tool 160 is in a closed position, as shown in FIG. 5B, the back-edge 186 of the trigger is in full contact with the back-stopper 134.

To ensure the tool 160 and its features are disengaged from the interior surface 124 of the casing 120 and can rotate freely into and out of the holster 136, the interior structure 130 includes a wall 132. The wall 132 is configured to establish a shape and height of the holster 136 sufficient to allow the tool 160, including its features, to move to open and closed positions. Preferably, the surface of the wall 132 has a uniform height, as measured by the distance between the edges aligned with the interior surface 124, in order to fully connect with the slabs 127, 125 on the same planes. The wall 132 can be arranged in any suitable manner depending, in part on the desired materials, manufacturing process, or features.

Referring to the example of FIG. 4, the edges of the wall 160 generally traverse the center of the casing 120 and are configured to support the separation of the back and front slabs 127, 125. The wall 132 in figure FIG. 4 is a maximum thickness and generally spans a maximum area of the interior of the casing 120. The wall 132 material fully covers the area between the inward facing surfaces of the wall 132 that face away from the holster 136, and generally occupies all but the minimum area between the two slabs required by the holster 136 to accept the tool 132 in the closed position. This arrangement generally supports the use of softer material in the manufacturing process. Additionally, the arrangement supports a machine-cutting manufacturing process by limiting the length of the required cut, as defined by the curved edges of the wall 132.

Figure 6A:
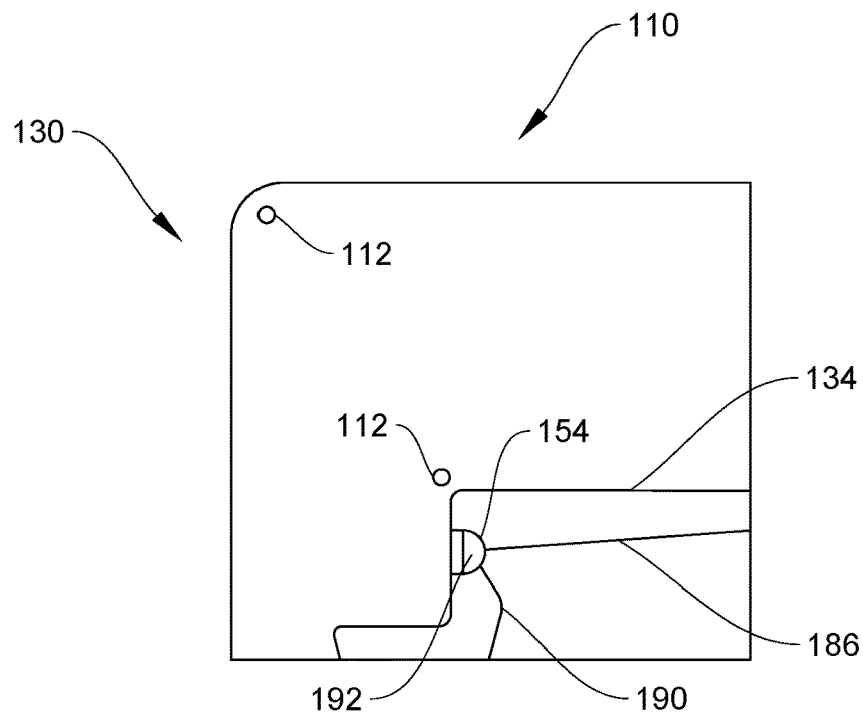
FIGS. 6A and 6B are an enlarged side elevation view of a section of the example of FIG. 4C taken in a window, as indicated in FIG. 4C by corners 6-6.
Figure 6B:
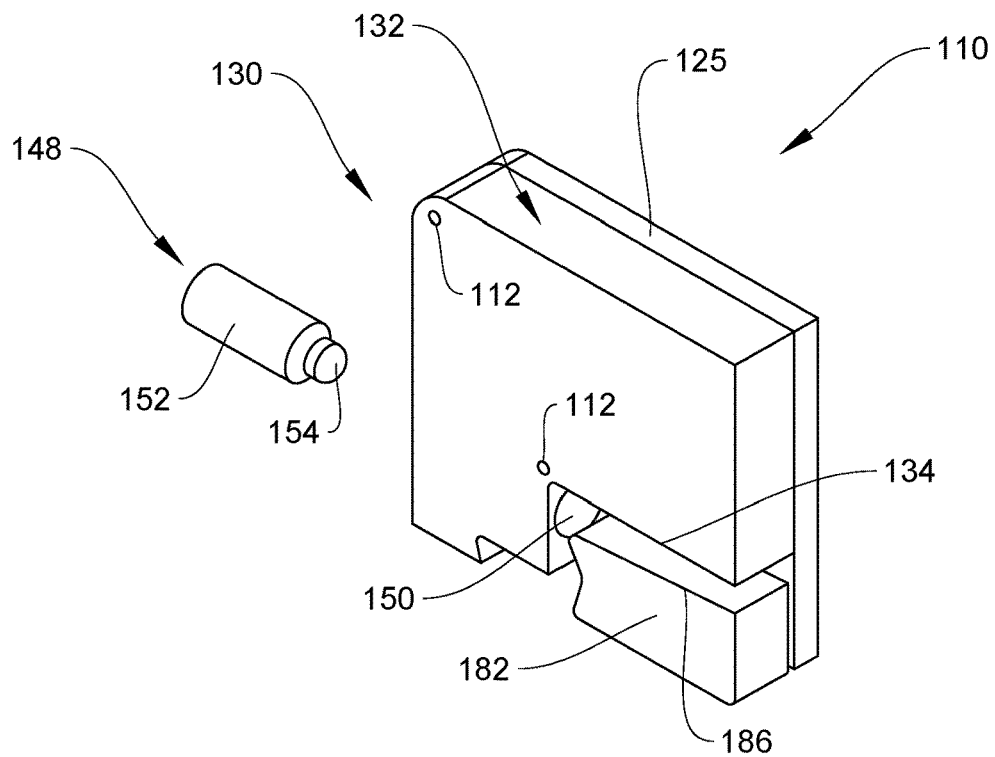
Figure 7:
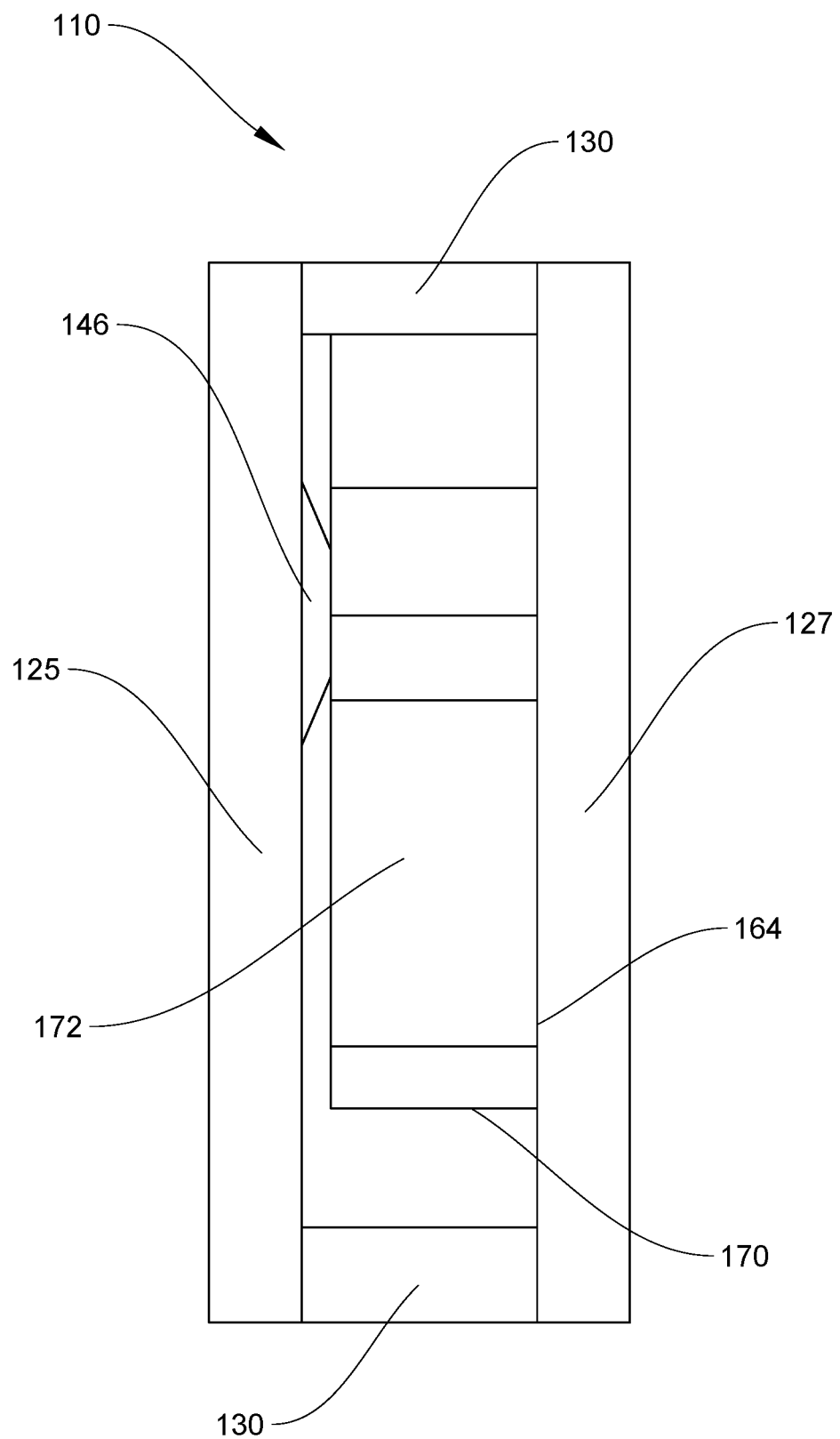
FIG. 7 is an enlarged perspective view of a section of the example of FIG. 1B taken in a window, as indicated in FIG. 4B by corners 7-7.

When in the closed position, to ensure the tool 160 is smartly secured in the holster 136 and easily accessible when needed, a pin spring 148, a friction bump 147, or a combination of both may be provided. Referring to FIGS. 6 and 7, enlarged side and cross-sectional views, respectively, of sections of system 110 are taken in windows indicated in FIG. 4 by corners 6-6 and 7-7. FIGS. 6 and 7 show various aspects of the system 110 as described below with references to FIGS. 1-4.

Referring to FIG. 6, a spring tunnel 150 is formed in the wall 132 of the interior structure 130 and is configured to accept an inner facing threaded pin spring 148, comprising a spring post 152 and a detent pin 154. The detent pin 154 is formed on the inner facing surface of the spring post 152 such that the detent pin 154, bears against the trigger 182 of the tool 160 when the tool 160 is near a closed position, as shown in FIG. 6.

In the present embodiment, the detent pin 154 comprises a dull pin press fitted into an aperture formed on the spring post 152 of the pin spring 148, as shown in FIG. 6. However, the detent pin 154 may be formed in any manner that provides the function as described.

The tool 160 includes a V-shaped detent divot 190 positioned on the bottom of the trigger 182. When the tool rotates into a closed position as shown in FIG. 4B, the detent pin 154 on the pin spring 148 engages the detent divot 190 on the trigger 182 and serves to hold the tool in the closed position, as shown in FIG. 4B. When the tool 160 is moved toward the open position, the detent pin 154 on the pin spring 148 is forced to flex outward as it moves along the tool from the mid-point of the detent divot 190.

Referring to FIG. 6, which shows the detent pin 154, as it engages the trigger 182, the tool 160 in the closing position. The pin spring 148 is positioned to provide the detent pin 154 with sufficient clearance to deflect outwards as it is forced into the spring post 152 by the trigger 182 of the tool 160. Also visible in FIG. 6 is a ramped surface 192 providing a transition between the back edge 186 of the trigger 182 and the detent divot 190. The ramped surface 192 permits the detent pin 154 to move easily from the point of contact with the tool 160 toward the mid-point of the detent divot 190 as the tool is moved from the open to the closed position.

The detent pin 154 may be configured in any manner in combination with the features of the system 110, and the tool 160 may be formed in any manner that provides the functions as described without departing from the spirit or scope of the disclosure.

Additionally, the detent pin 154 may be configured with any strength of bias placed on the tool 160. In some embodiments of the system, a detent pin 154 with a weak bias may be selected and positioned to provide primarily an audibly perceptible indication that the tool has reached the closed position. In such an embodiment, a friction bump 147 may be provided to generate further bias to smartly secure the tool 160 in the holster 136.

Referring to FIG. 4C, a friction bump 147 is formed on the inner facing surface of the front slab 125 and is configured to lightly secure the tool 160 in the closed position. The friction bump 147 bears against the tool 160 along a common access that lies perpendicular to a plane defined by the movement of the tool 160.

In the present embodiment, the friction bump 147 comprises additional material that forms a raised bump positioned to interact with the tip of the primary grab feature 172 of the tool 160 while in a closed position. However, the friction bump 147 may be formed and positioned in any manner that provides the functions as described.

When the tool 160 is moving to a closed position, the friction bump 147 interrupts the trajectory of the tool 160 and forces the opposite sided of the tool 160 to bear against the back slab 127. In turn, both slabs 127, 125 flex outward slightly and bear against the tool. When the tool 160 is in the closed position, the friction bump 147 and the back slab 127 apply bias to the primary grab feature 172 on opposite sides of the tool 160 and serve to hold the tool 160 in the closed position, as shown in FIG. 7. Thus, in FIG. 4B, the friction bump 147 and the primary grab feature 172 occupy the same position, so the friction bump 147 is not separately visible. The distance between the tip of the primary grab feature 172 and the point where the friction bump 147 engages the primary grab feature 172 in the closed position determines the degree of rotation over which the user must apply force before the tool 160 freely moves into the open position. In the present embodiment, the distance is selected to be very short to limit the amount of friction the user must overcome to release the tool 160.

The friction bump 147 may be reconfigured to increase or reduce the bias that the user must overcome before the tool 160 can freely move to an open position. Increasing the size of the friction bump 147 increases the strength of the bias by causing the slabs 127, 125 to flex further outward on contact with the tool 160. In turn, reducing the size of the friction bump 147 decreases the strength of the bias. Repositioning the friction bump 147 to align with a position on the tool 160 closer to the primary spine 161 increases pull of the bias by increasing the degree of rotation over which bias is applied before the tool freely moves to an open position. In turn, reposition the friction bump 147 to align with a position on the tool 160 further from the primary spine reduces the pull of the bias.

It will be appreciated by a person skilled in the art, that some components of the system can be rearranged forming an alternative configuration. For example, the friction bump 147 can be moved from under the primary grab feature 172 to somewhere under the trigger 182. This repositioning might be done to provide the top tab with more leverage to overcome the friction of the bump. The detent bump 190 would move from the bottom to the back edge 186 of the trigger, and the pin spring 148 would relocate to that position as well. To accommodate those relocations, the spring tunnel 150 shown in FIG. 6 would also need to be relocated and a spade would be added to the back edge of the trigger to accommodate the design.

Figure 8A:
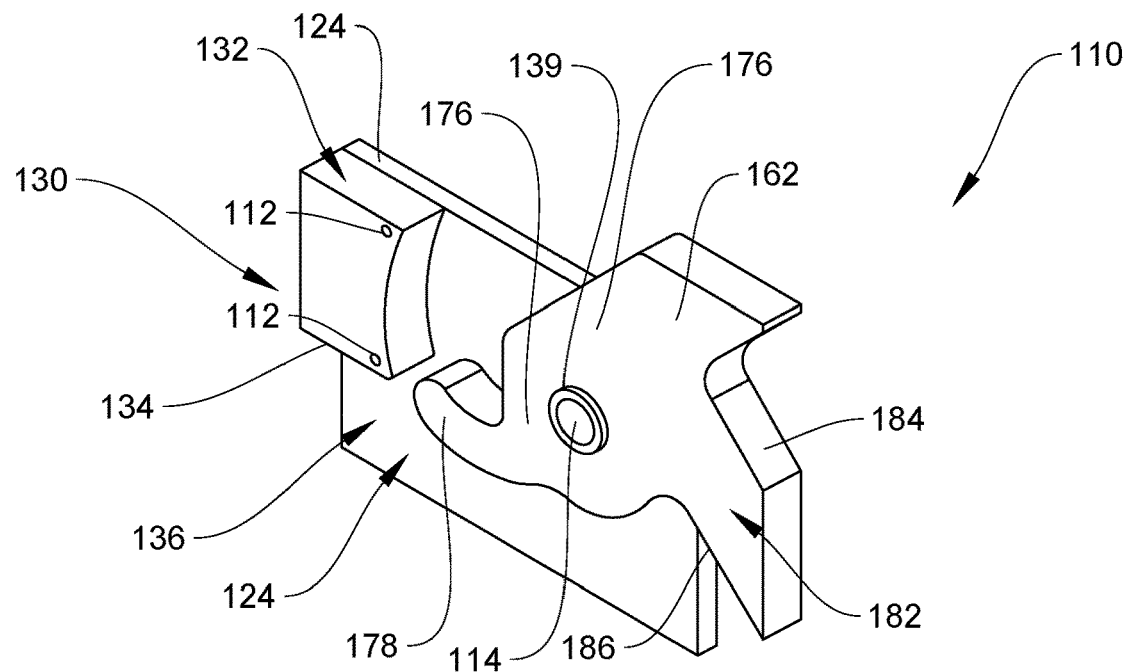
FIGS. 8A and 8B is an alternative of the example shown in FIGS. 5A and 5B according to various embodiments of the present disclosure.
Figure 8B:
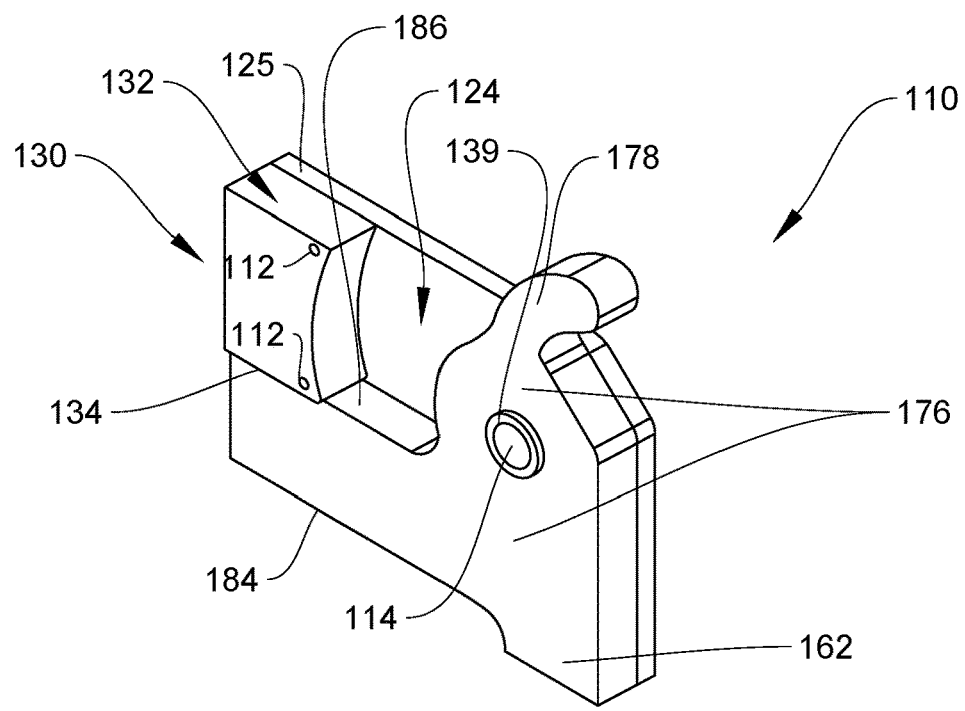

Turning now to FIGS. 8A and 8B, showing an alternative example of system 110, defined by differences in features included in the view of the section of system 110 illustrated in FIGS. 5A and 5B. The interior structure 130 is configured to extend the allowable range of motion of the tool 160 to beyond 180 degrees. FIGS. 8A and 8B show the opened and closed positions of a system 110 with the front-stopper 133 removed. The window of the system 110 in FIGS. 8A and 8B shares structural similarities with the system 110 of FIGS. 1-5. Identical reference numbers indicate structures of such similarity as to require little or no additional description. Removal of the front-stopper 133 allows the tool 160 to rotate freely beyond the 90-degree angle constraint imposed by the front stopper of system 110. The washer 139 is preferred in the embodiment shown in FIG. 8, as removal of the front-stopper 133 from the interior structure 130 increases the susceptibility to friction caused by outside forces compressing the slabs against the surface of the tool 160.

In the embodiments described with references to FIGS. 1-5, the washer 139 serves to separate the slabs 127, 125 while the front and back-stoppers 133, 134 define the limits of the rotation of the tool 160 between the open and closed position. Alternative to this arrangement, means for supporting the interior structure and defining the limits of the rotation may be provided by other alternative features, as described herein.

Referring to another alternative example of a system 110, defined by differences in features included in the view of the section of system 110 illustrated in FIGS. 5A and 5B, FIGS. 9A and 9B show the opened and closed positions of system 110 with an interior structure 130 comprising a corner wall 141 and excluding the washer 139. The system 110 of FIG. 9 shares structural similarities with the system 110 of FIGS. 1-5. Identical reference numbers indicate structures of such similarity as to require little or no additional description.

The corner wall 141, like the washer 139 of FIGS. 1-5, is positioned in proximity to the pivot point 114 to guard the tool 160 from fiction caused by outside forces that may compress the slabs 127, 125 against the surface of the tool 160 surrounding the tool 160 attachment feature 174.

Figure 9A:
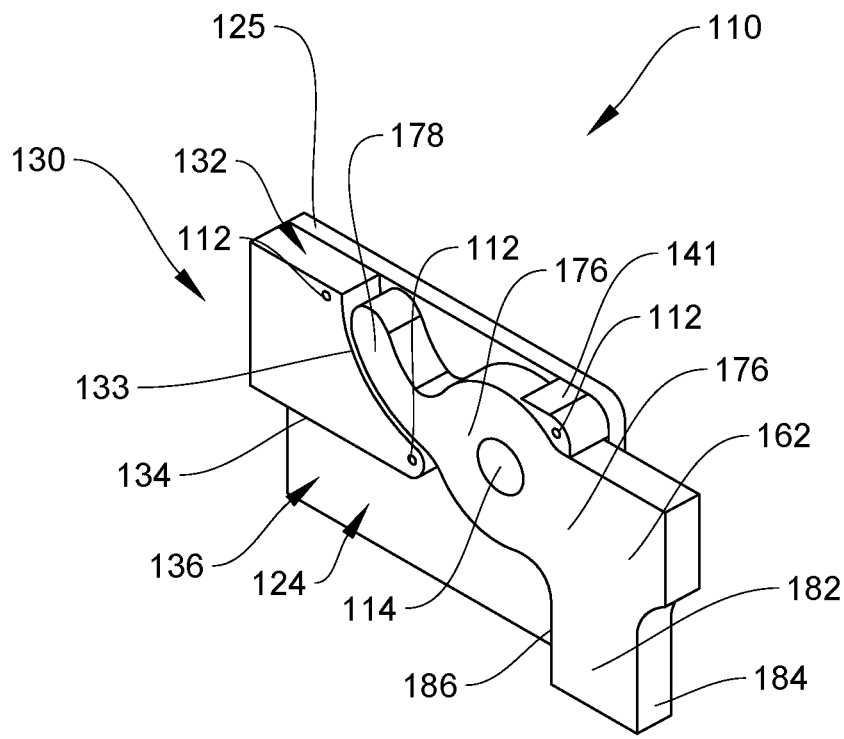
FIGS. 9A and 9B is another alternative of the example shown in FIGS. 5A and 5B according to various embodiments of the present disclosure.

The corner wall 141 of the embodiment of FIG. 9 serves the additional purpose of providing a visible signal of the rotational limits of the tool and is configured in combination with the tool 160 to avoid heavy contact with the tool 160. With the tool attachment feature 174 in the same position, and rotational limit of the tool 160 in the same range as in the examples in FIG. 1-8, outward facing material of the tool 160 surrounding the pivot point 114 is reduced to allow the tool 160 to avoid contact with the corner wall 141. This reduction in material is perhaps best shown in FIG. 9A, where the top of the fixture area 176, as illustrated in FIG. 9A by the fixture area above a horizontal plane along the pivot point 114, is reduced in size, or lowered. The fixture area 176 is lowered to allow the edges of the tool 160 to rotate around and avoid contact with the corner wall 141. Based on the configuration of the tool 160, the corner wall 141 is sized to sit outside the rotational limits of the edges of the tool 160, set by the front and back-stoppers 133, 134, as described hereafter.

Figure 9B:
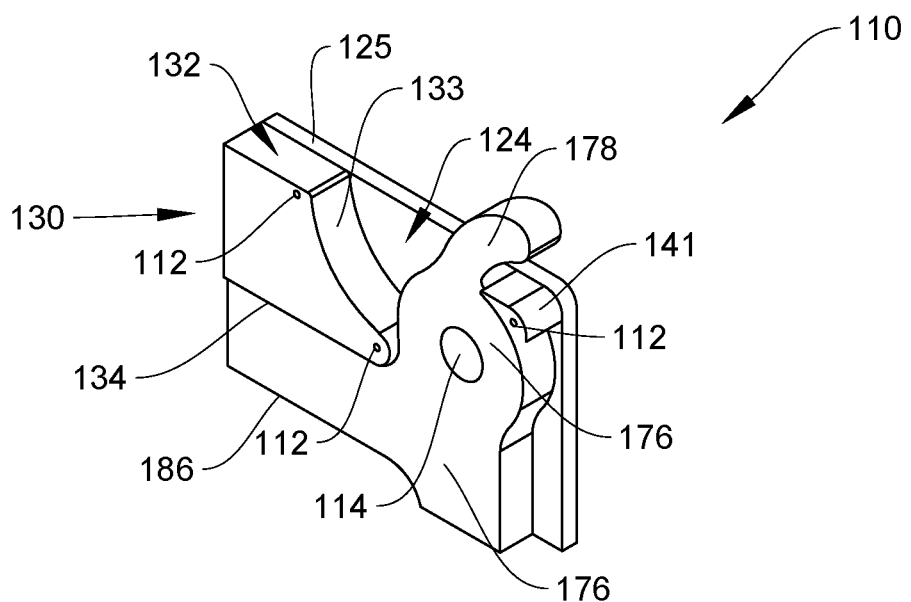

Referring still to FIGS. 9A and 9B, front and back stoppers 133, 134, serve both to limit the travel of the tool 160 between the open and closed positions, as they do in FIGS. 5A and 5B, and block the corner wall 141 from interfering with the movement of the tool 160. That is, the front and back stoppers 133, 134 protect the corner wall from heavy contact with the tool 160, thus allowing the use of softer materials in the manufacturing process.

In some embodiments, the front and back-stoppers 133, 134 may be reconfigured or removed, and/or the features of the casing 120 and tool 160 reconfigured to set and define alternative limits to the travel of the tool 160 and alternative open and closed positions. In an alternative embodiment, the pivot point 114 may be lowered, and the front-stopper 133 reconfigured to define an opening angle of rotation greater than 90 degrees. However, such an embodiment would also require the primary spine 161 of the tool 160 to be shortened and the back-stopper 134 to be reconfigured to maintain the same closing limit.

Figure 20A:
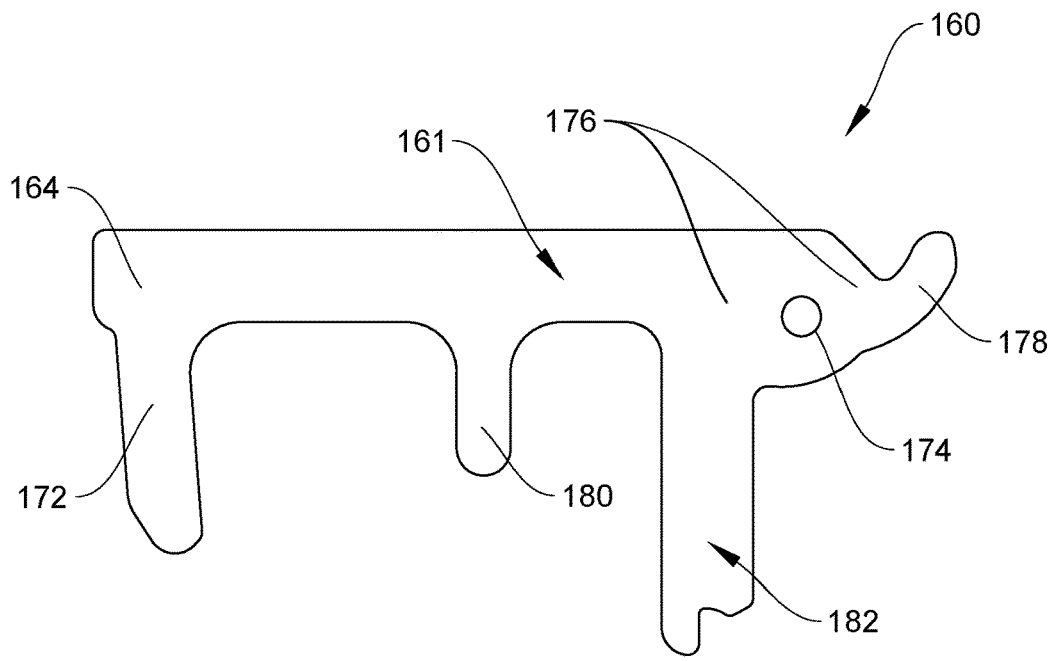
FIGS. 20A-20G show different configurations of the touchless tool in accordance with various embodiments of the present disclosure.
Figure 20B:
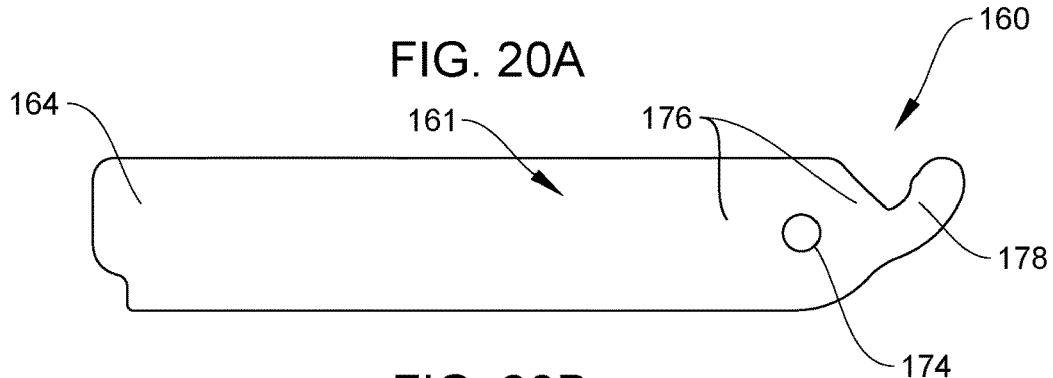
Figure 20C:
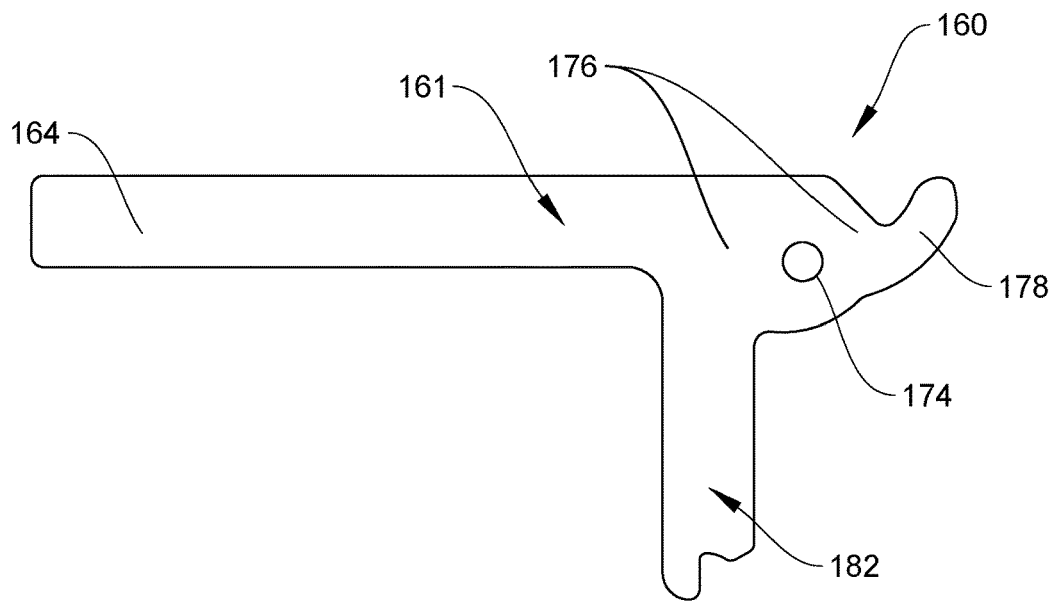
Figure 20D:
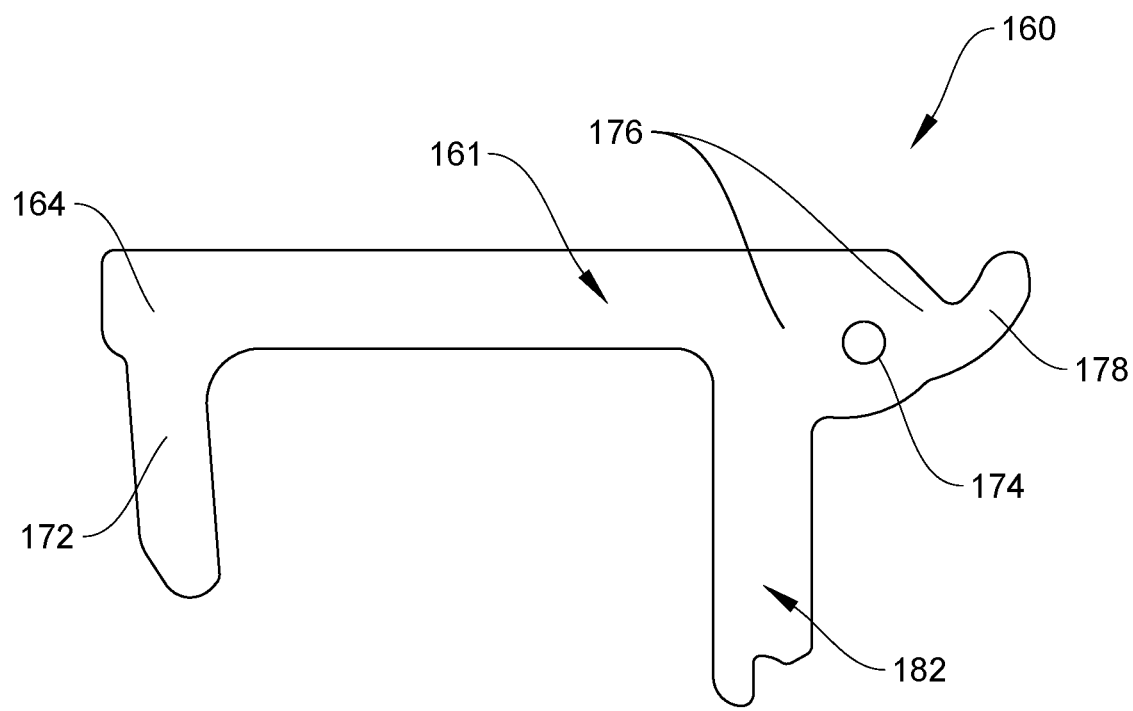
Figure 20E:
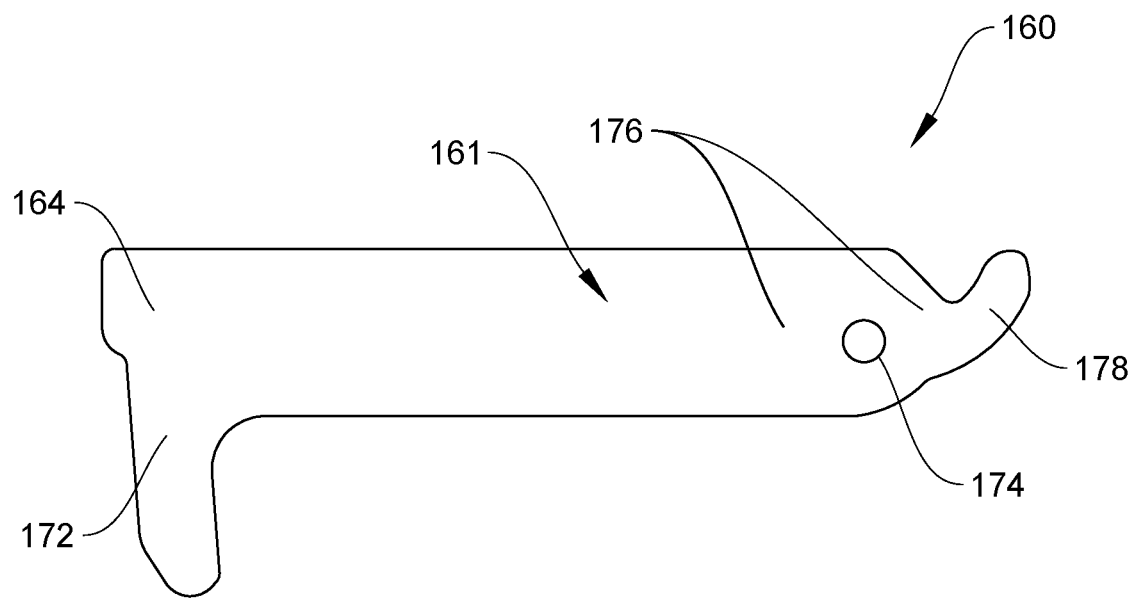
Figure 20F:
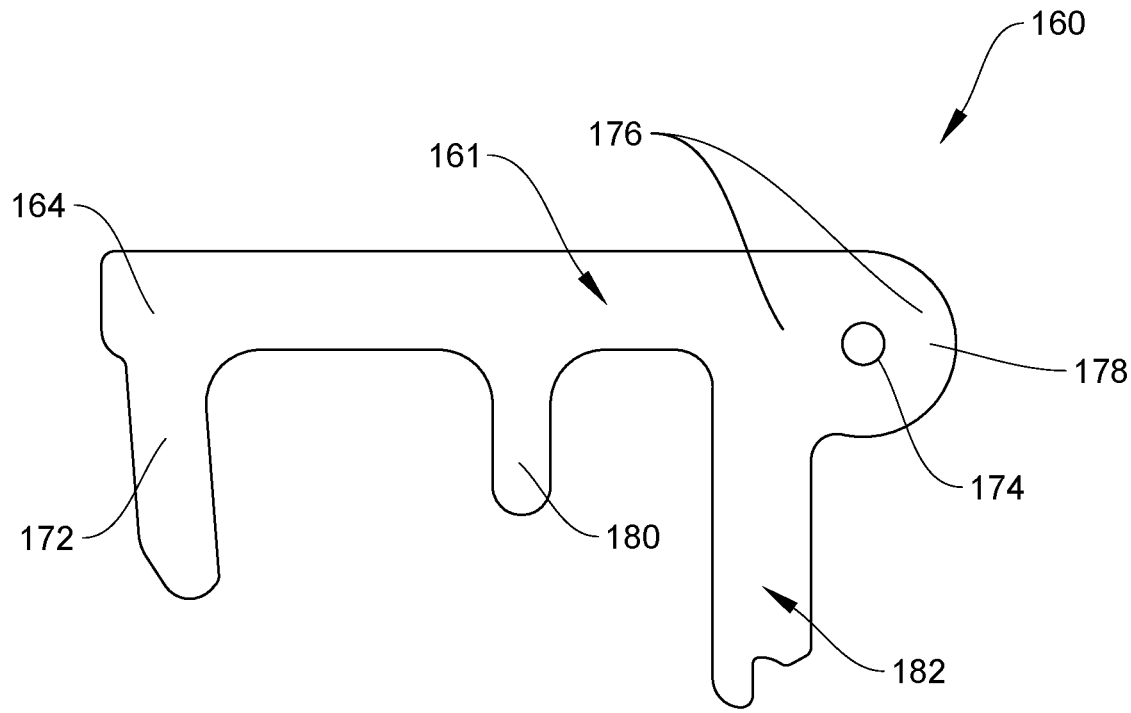
Figure 20G:
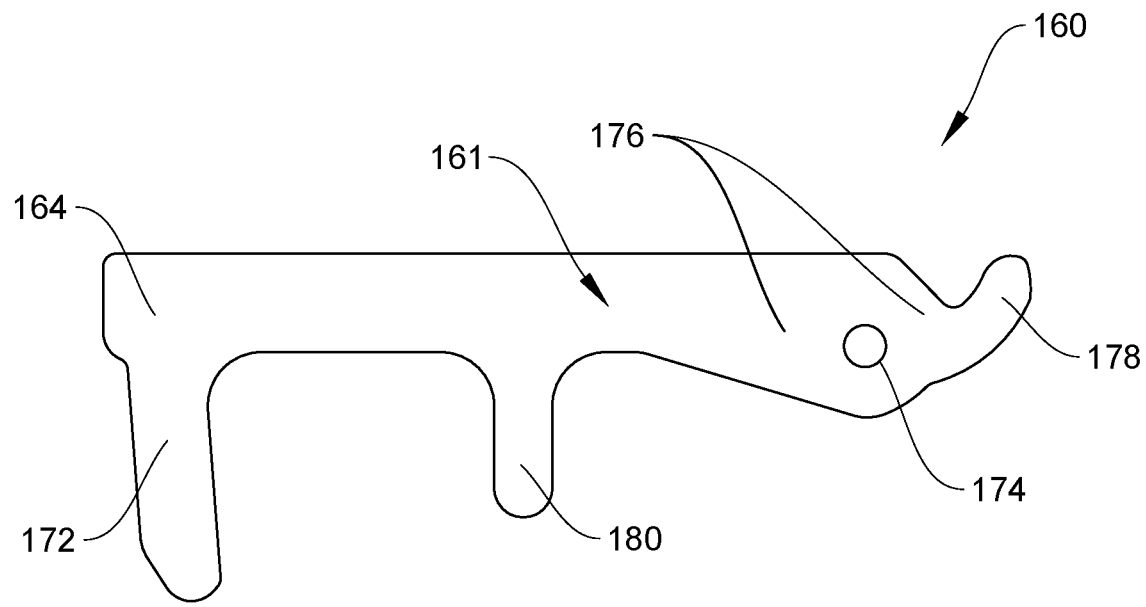

Referring to FIGS. 20A-20G, the tool 160 can be of various configurations. According to a preferred embodiment, the tool 160 can include primary spine (base member) 161 having top tab 178, trigger 182, primary grab feature (member) 172 and second grab feature (member) 180 as shown in FIG. 20A. In some instances, the tool 160 can include primary spine (base member) 161 having top tab 178 as shown in FIG. 20B, for example. In some other instances, the tool 160 can include primary spine (base member) 161 having top tab 178 and trigger 182 as illustrated in FIG. 20C. According to some embodiments of the present disclosure, the tool 160 can include primary spine 161 top tab 178, trigger 182 and primary (first) feature 172 as illustrated in FIG. 20D. In some instances, the tool 160 can include primary spine 161, top tab 178 and primary grab feature 172 as shown in FIG. 20E, for example. In some instances, the tool 161 can be devoid of top tab 178 as illustrated in FIG. 20F, for example (wherein the proximate end of the spine 161 is rounded). And yet in some other instances, the tool 161 can be devoid of trigger 182 as illustrated in FIG. 20G, for example. According to some embodiments, the tool 160 can include just the primary spine 161 and the pivot point 174 (not shown).

In some embodiments, the system can further employ a locking mechanism with a spring positioned inside the casing and having a lock knob or push button disposed on the casing, wherein the spring is configured to bias the push button thereby permitting the tool to pivot relative to the casing from a folded locked position to an unfolded unlocked position.

Figure 10:
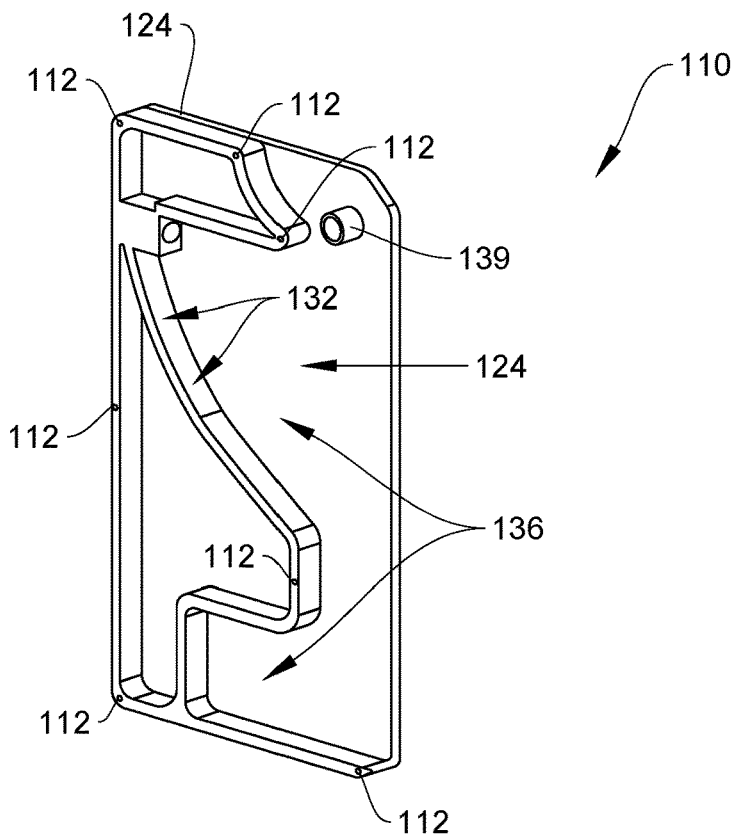
FIG. 10 is a perspective view of an alternative example of a wall and a front slab according to various embodiments of the present disclosure.
Figure 11:
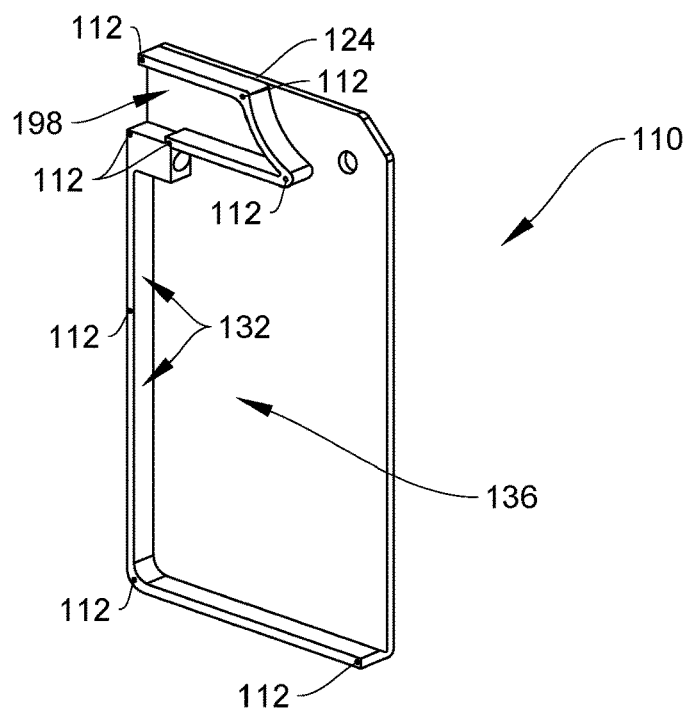
FIG. 11 is a perspective view of another alternative example of a wall and a front slab according to various embodiments of the present disclosure.

Turning now to FIGS. 10 and 11, showing an alternative example of system 110, defined by differences in the configuration of the wall 132 shown in FIG. 4 on the front slab 125 of system 110. The wall 132 may be reduced in thickness (FIG. 10) by hollowing wall 132 material between inner facing edges of the wall 132, or may be reduced in structure by reducing the distance between outer facing edges of the wall 132 thereby increasing the size of the holster (FIG. 11).

Arrangements such as those in FIG. 10 and FIG. 11 reduce manufacturing costs and increase manufacturing options by reducing material required for 3D printing and allowing for the use of an injection mold, as the arrangements have open structures and have uniform surface thicknesses. Injection molded parts generally can be molded from a variety of materials including sturdy rubbers and durable plastics. The system 110 components may be injection molded in two separate pieces including, one, an arrangement as shown in FIG. 10 or FIG. 11, and, two, the front slab 125. System 110 components can also be injected molded into one single piece, including the arrangement in FIG. 11 and a back slab 127, as such an arrangement remains an open structure with two injection mold entry points; one entry point being the holster 136 and the second entry point 199 being on the opposite side of the casing.

Figure 12A:
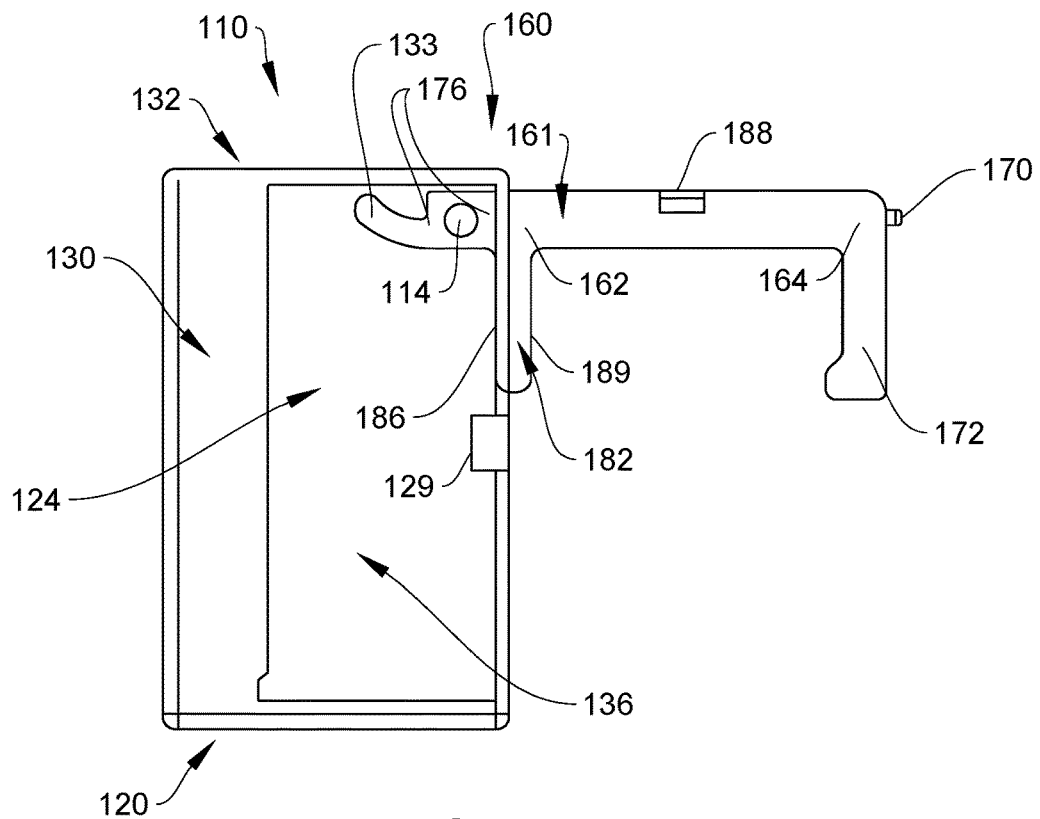
FIGS. 12A and 12B are side elevation views of another example of a personal case system with touchless-tool feature, showing in various rotational positions, according to various embodiments of the present disclosure.
Figure 12B:
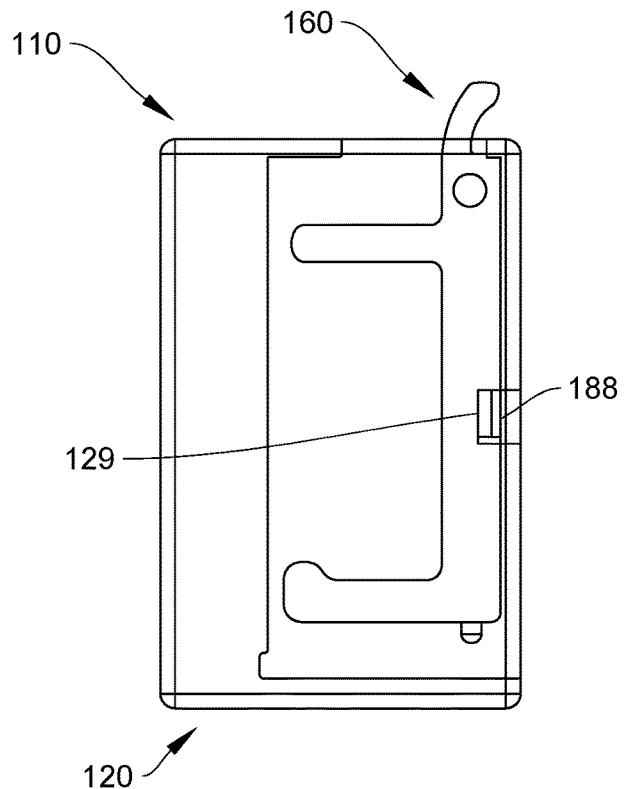
Figure 13A:
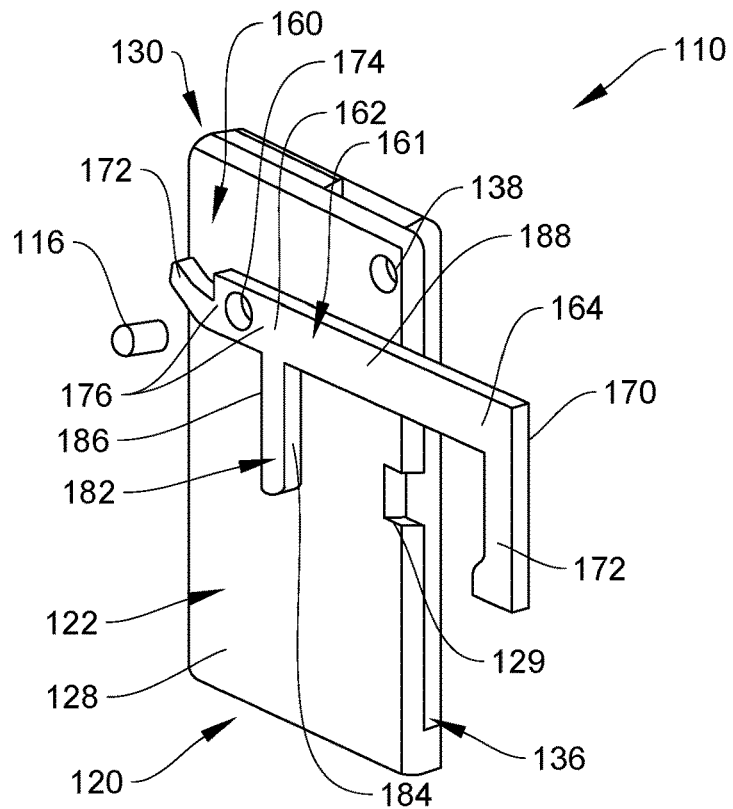
FIGS. 13A and 13B are exploded back and front perspective views of the example of FIG. 12.
Figure 13B:
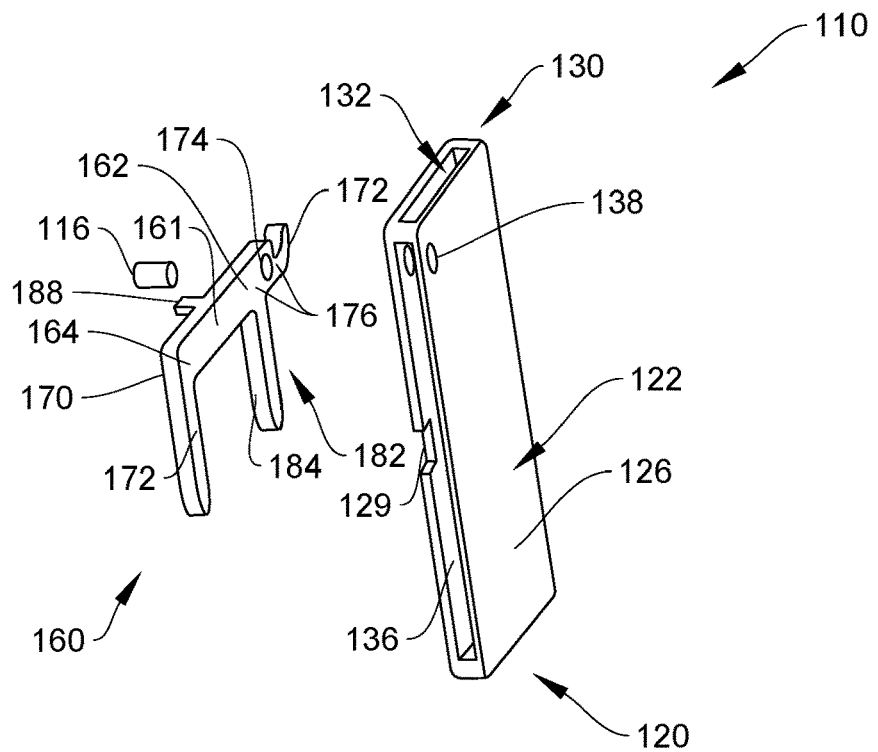

Turning now to FIGS. 12-13, side elevation and exploded perspective views, respectively, show another example of the system 110 according to various embodiments of the present disclosure. The example of FIGS. 12-13 shares structural similarities with examples in FIGS. 1-10. Identical reference numbers indicate structures of such similarity as to require little or no additional description. The casing 120 in FIG. 12 is modeled with transparent material to keep the back slab 127, comprising alternative features, in view.

A side-groove 129 is cut from the edge of the casing 120 at the entrance of the holster 136 and is configured to define the closing position of the tool 160. The tool 160 includes a similarly shaped side tab 188, comprising a ridge, as perhaps best seen in FIG. 13. The side-groove 129 receives the side tab 188 as the tool rotates into the closing position. Thus, when the tool 160 is in the closed position the surface of the side tab 188 is in full contact with the surface of the side-groove 129, as shown in FIG. 12B.

The corner wall 141 is configured to define the open position of the tool 160. When the tool is in the open position, the top edge of the fixture area 176 adjacent the pivot point 114 is in contact with the bottom of the corner wall 141, as shown in FIG. 12A. That is, the corner wall 141 supports the weight of the tool 160 when used in an open position. Thus, preferably, the corner wall 141 is formed of a strong material such as a metal/or a durable plastic fortified by fastener, preferably steal. Such a structure is supported by a CNC manufacturing process, in which the interior structure 130, including the corner wall 141, and the front slab 125 is carved from a single piece of metal or durable plastic, that is, in turn, pinned to the back slab 127. Alternatively, the interior structure 130, and the slabs 127, 125 of the casing may be cut separately, and the corner wall 141 fixed between the slabs 127, 125 and secured with a fastener.

Returning to the side tab 188, which, in addition to setting the closing position, is configured to serve as a method for moving the tool 160 to the open position. To open the tool 160, the user can push outward against the side tab 188 to pivot the tool away from the close position. In the present embodiment, the side tab 188 is placed near the center of the edge of the casing 120. In alternative embodiments, the side tab 188 may be positioned closer to or further from the top of the edge to increase or reduce leverage of the force of the outward push.

One of or a combination of several manufacturing methods may be employed to construct the system from metals, wood, sturdy rubber, and/or durable plastics including nylon or another polymer. Possible methods include the 3D printing, CNC machining, water jet, and laser cutting methods discussed herein. 3D printing may form the casing in a single piece. CNC machining may form the casing in two pieces, one of the pieces comprising the interior structure 130 cut into one of the slabs. A water jet or laser cutter may form the casing in three pieces, with one of the pieces comprising interior structure 130. The casing manufactured in multiple pieces, may be subsequently pinned or glued together. The tool 160 is most preferably formed of a conductive metal and cut from a slab using a water jet or laser cutter. The tool 160 may also be formed from a hard polymer using a 3D printer or an injection mold. The features of tools 160 formed of a hard polymer preferably are fortified by adding material to, rounding out, or effectively dulling the angles where features of the tool 160 connect.

Embodiments of the system 110 have been described with reference to touchless-tool features. However, the scope of the disclosure is not limited to touchless-tools, but encompasses any feature and/or combination of features capable of being fixed to the fixture area 176 of the tool 160. In alternative embodiments, the tool 160 may serve different functions while comprising similar features of the tool 160 of FIGS. 1-13 and 19.

In some embodiments, the tool 160 may comprise features forming a USB drive storage tool configured to allow a user to attach, store, and retrieve USB drives. In the example of the tool 160 shown in FIGS. 15 and 16, the primary spine 161 is fixed to a plurality of storage pegs 193 onto which USB drives 194 can be smartly secured and removed. The back side of the USB storage drive 194, as illustrated in FIG. 16B, includes a USB drive fastening aperture 195 that is configured to detachably connect with the tool 160. A plurality of USB storage pegs 193 extend from the primary spine 161 of the tool 160, as perhaps best illustrated in FIG. 14. The fastening aperture 195 may be smartly secured to the storage pegs 193 by connecting a perforation in the material on the top of the fastening aperture 195, forming a female connecting end, to a ridge shaped on the top of the storage peg 193, forming a male connecting end.

In some embodiments, the tool 160 may comprise features forming a multi-prong nail filing tool configured to provide a user with access to multiple grades of nail files. The primary spine 161 may be fixed to a plurality of prongs with surfaces covered with different grades of nail filing material. The prongs may be formed on the primary spine 161 in the same manner and configured in a similar shape of a grab feature formed on a the primary spine 161 of the tool 160 as shown in FIGS. 1-13 and 19.

In some embodiments of the system 110, the casing 120 may be configured in combination with additional features that promote the use of the system 160. Some additional features may directly improve the usefulness of the tool 160. Other additional features serve a use on their own, and so may indirectly improve the usefulness of the tool 160 by motivating a user to carry system 110 their person, thereby enhancing the availability of the tool 160.

Figure 17:
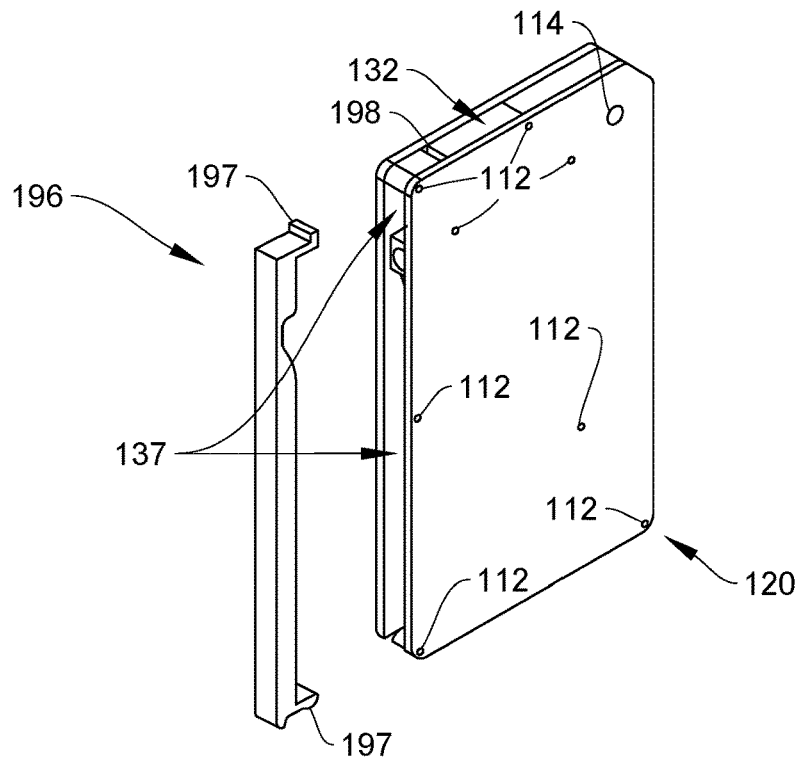
FIG. 17 is a partially exploded perspective view of a personal case system with a storage cavity feature according to various embodiments of the present disclosure.
Figure 18:
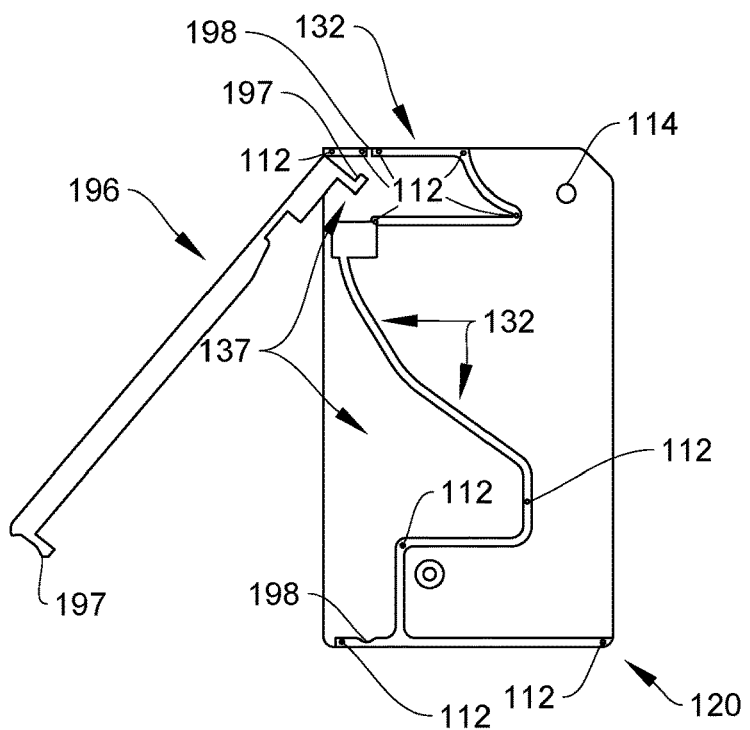
FIG. 18 is a partially exploded side elevation view of the example of FIG. 17 with the back slab removed and the cavity cover repositioned.
Figure 19:
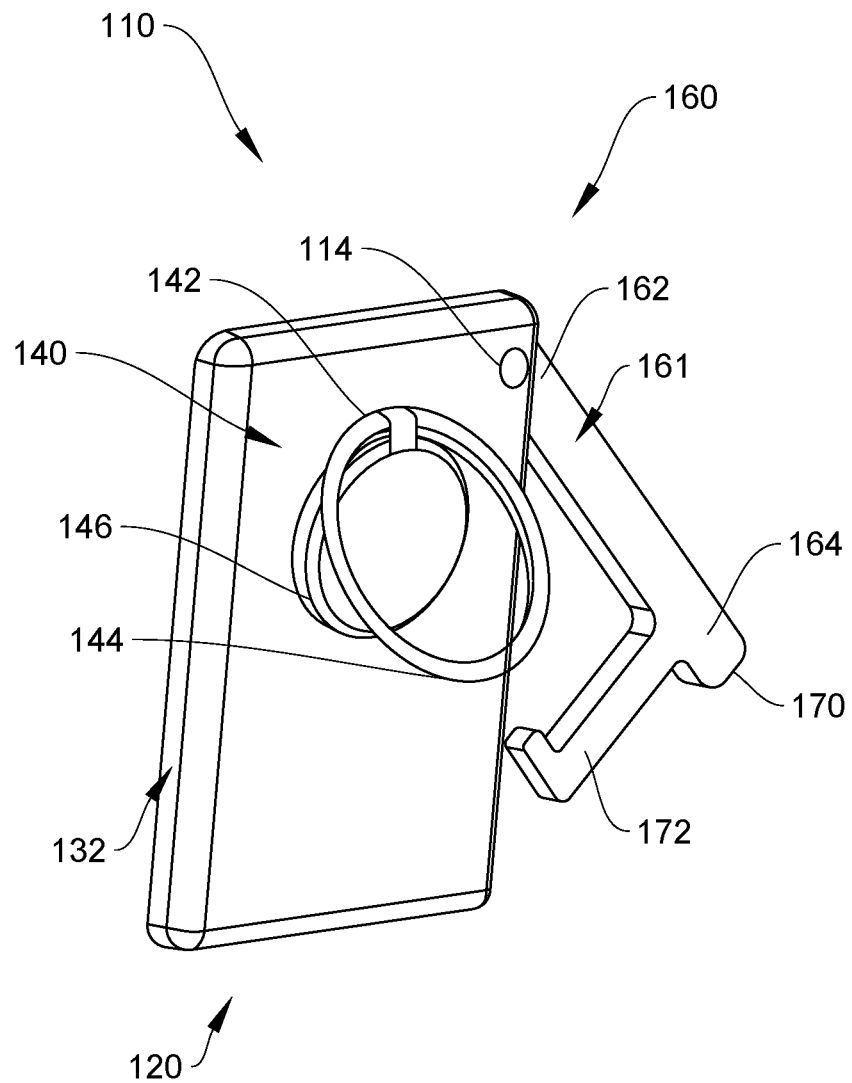
FIG. 19 is a perspective view of a personal case system with an extension ring feature according to various embodiments of the present disclosure.

In some embodiments, the casing 120 may include a storage cavity 137 that allows a user to use the casing 120 as a storage compartment. As exemplified in FIG. 17, a cavity cover 196 is temporarily detachable from an unused side of the casing 120 and is configured to provide access to a storage cavity 137. The interior structure 130 of FIG. 17 includes a wall 132, which separates the storage cavity 137 from the holster 136 so that both the cavity 137 and the holster 136 occupy distinct areas between the slabs of the casing 120. To limit the chance that contents placed in the storage cavity 137 will come into contact with the tool 160 in the holster 136, the wall 132 is preferably arranged with no open gaps between areas of the storage cavity 137 and the holster 136. The storage cavity 137 and the cavity cover 196 may include more than one pair of joinable male and female cavity latches 197, 198 configured to temporarily secure the cavity cover 196 against the entrance to the storage cavity 137. As shown in FIG. 18, male cavity latches 197 on the cavity cover 196 are shaped and positioned to fasten into the female cavity latches 198 in the storage cavity 197. The male cavity latch 197 at the bottom of the casing is sloped so that when the storage cavity 197 is closed and an outward bias is applied to the bottom of the cavity cover 196, the cavity cover 196 will pivot away from the storage cavity 197. Some embodiments may include more than one storage cavity 137 separated by interior structure of the casing 120.

In some embodiments, the casing 120 may include at least one handle extension feature 140 that supports a users grip on the system 110. The handle extension feature 140 generally comprises a handle feature 144 formed of any suitable size, shape, and design. As exemplified in FIG. 19, the handle extension feature 140 includes a handle feature 144 that is configured to rotate outward from the casing 120 when needed by a user. Handle feature 144 may be formed of any suitable size, shape, and design. A handle holster 146, formed on the back area 128 of the casing 120, includes a handle attachment feature 142 from which the handle feature 144 rotates to an outward position. The handle attachment feature 142 includes an aperture configured to accept the handle feature 144. The handle feature 144 may include a pin, another fastening mechanism, may itself be configured to fit through the aperture of the handle attachment feature 142. In the example shown in FIG. 19, the handle feature 144 is formed of an elliptically shaped broken ring, and the material of the handle feature 144 before the break point is shaped to form a pin that can be fed through the aperture of the handle attachment feature 142. To fasten the handle feature 144 to the handle attachment feature 142, the two ends of the handle feature 144 at the break point can be pulled apart, aligned with the aperture of the handle attachment feature 142, and then touched together through the aperture of the handle attachment feature 142 by squeezing the handle feature 144.

According to one embodiment, a personal case system of the present disclosure includes tool 160 having primary spine 161, a distal end and a proximate end (the proximate end being the end of the tool that may include one or more features surrounding pivot point 114, i.e., features attached to connecting apparatus 116; the distal end being the end of the tool opposite the proximate end). The tool 160 is pivotally connected by the proximate end to casing 120 at pivot point 114. The casing 120 includes a front side (comprising front slab 125 and front area 126), back side (comprising back slab 127 and back area 128), a sidewall formed by a top side, bottom side and a rear side (comprising the wall 132) and a space (holster 136) formed between the front side and the back side and adapted to receive at least a portion of the tool. The tool can be rotated, relative to the casing, around the pivot point between an open position in which the tool extends from the casing, and a closed position in which the tool retracts into the space of the casing; and wherein the pivot point is located at the top corner of the casing opposite the rear side. In some instances, the distal end of the tool 160 can be terminated in a bottle opener having a grab hook or an opening sized to fit a bottle cap to open a beer bottle cap, or soda bottle cap, or the like).

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A personal case system comprising:
a tool having a primary spine, a distal end and a proximate end, the tool pivotally connected by the proximate end to a casing at a pivot point, the casing having a front side, a back side, a sidewall formed by a top side, bottom side and a rear side, and a space formed between the front side and the back side and adapted to receive at least a portion of the tool; wherein the tool can be rotated, relative to the casing, around the pivot point between an open position in which the tool extends from the casing, and a closed position in which the tool retracts into the space of the casing; and wherein the pivot point is located at a top corner of the casing opposite the rear side; wherein the tool further comprising a first grab member extending substantially perpendicularly from the primary spine of the tool at the distal end.

2. The system of claim 1 wherein the tool further comprising a trigger member extending substantially perpendicularly from the primary spine of the tool at the proximate end; and wherein the pivot point is positioned on the spine of the tool above the trigger member.

3. The system of claim 1, wherein the tool further comprising a second grab member extending substantially perpendicularly from a middle of the primary spine of the tool.

4. The system of claim 1, wherein the distal end of the tool terminates in a touch extension member.

5. The system of claim 1, wherein the proximate end of the tool terminates in a top tab.

6. The system of claim 5, wherein the casing further comprising a front stopper configured to prevent the tool from extending from the casing by more than 90 degrees.

7. The system of claim 1, further comprising a storage compartment inside the casing and a removable lid disposed in the rear side of the sidewall.

8. The system of claim 1, wherein the tool further comprising one or more USB holders.

9. The system of claim 1, wherein the tool further comprising one or more nail filers.

10. The system of claim 1, wherein the tool further comprising a laser pointer.

11. The system of claim 1, wherein at least one of the front side and back side of the casing further comprising attaching means for attaching the casing to a mobile device or a protective case for a mobile device.

12. The system of claim 1, wherein the casing is fused with a protective case for a mobile device forming a single integral part.

13. The system of claim 1, wherein at least one of the front side and the back side of the casing further comprising a handle attachment member coupled to a handle member adapted to rotate to an outward position from the handle attachment member.

14. The system of claim 1, wherein the casing further comprising a back stopper positioned behind the back edge of the trigger or the back edge of the primary spine and configured to stop the movement of the tool when retracted into the casing.

15. The system of claim 1, wherein at least a portion of the top side of the sidewall is removed.

16. The system of claim 1, wherein at least a portion of the bottom side of the sidewall is removed.

17. The system of claim 1, wherein at least a portion of the rear side of the sidewall is removed.

18. A personal case system comprising:
a tool having a primary spine, a distal end and a proximate end, the tool pivotally connected by the proximate end to a casing at a pivot point, the casing having a front side, a back side, a sidewall formed by a top side, bottom side and a rear side, and a space formed between the front side and the back side and adapted to receive at least a portion of the tool; wherein the tool can be rotated, relative to the casing, around the pivot point between an open position in which the tool extends from the casing, and a closed position in which the tool retracts into the space of the casing; and wherein the pivot point is located at a top corner of the casing opposite the rear side; wherein the casing further comprising a pin spring, or a friction bump, or a combination thereof to ensure the tool is snugly secured in the casing.

19. The system of claim 18 wherein the tool further comprising a trigger member extending substantially perpendicularly from the primary spine of the tool at the proximate end; and wherein the pivot point is positioned on the spine of the tool above the trigger member.

20. The system of claim 18, wherein the tool further comprising one or more notches corresponding to at least one of the pin spring and the friction bump.

* * * * *